(12) United States Patent
Hara

(10) Patent No.: US 7,788,791 B2
(45) Date of Patent: Sep. 7, 2010

(54) METHOD OF JOINING A PLURALITY OF CONDUCTOR SEGMENTS TO FORM STATOR WINDING

(75) Inventor: Satoru Hara, Anjo (JP)

(73) Assignee: Denso Corporation, Kariya (JP)

( * ) Notice: Subject to any disclaimer, the term of this patent is extended or adjusted under 35 U.S.C. 154(b) by 190 days.

(21) Appl. No.: 12/003,017

(22) Filed: Dec. 19, 2007

(65) Prior Publication Data

US 2008/0148551 A1 Jun. 26, 2008

(30) Foreign Application Priority Data

Dec. 20, 2006 (JP) ............................... 2006-342830

(51) Int. Cl.
*H02K 15/00* (2006.01)
*H02K 15/14* (2006.01)
(52) U.S. Cl. ............................ 29/596; 29/598; 29/605; 29/732; 219/125.11; 310/71
(58) Field of Classification Search ........... 29/596–598, 29/605–606, 732; 310/68 R, 71; 219/75, 219/132–133, 125.11
See application file for complete search history.

(56) References Cited

U.S. PATENT DOCUMENTS

| | | |
|---|---|---|
| 6,181,044 B1 | 1/2001 | Umeda et al. |
| 6,201,332 B1 | 3/2001 | Umeda et al. |
| 6,249,956 B1 | 6/2001 | Maeda et al. |
| 6,403,921 B1 | 6/2002 | Maeda et al. |
| 6,404,091 B1 | 6/2002 | Nakamura et al. |
| 6,490,779 B1 | 12/2002 | Tokizawa et al. |
| 6,698,083 B2 | 3/2004 | Tokizawa et al. |
| 6,885,123 B2 | 4/2005 | Gorohata et al. |
| 6,990,724 B2 * | 1/2006 | Tamura et al. ............... 29/596 |
| 7,086,136 B2 | 8/2006 | Gorohata et al. |
| 2002/0041129 A1 | 4/2002 | Oohashi et al. |
| 2003/0137207 A1 | 7/2003 | Tamura et al. |
| 2006/0141874 A1 | 6/2006 | Lenoir et al. |

FOREIGN PATENT DOCUMENTS

| | | |
|---|---|---|
| EP | 1 043 828 A2 | 10/2000 |
| EP | 1 376 816 A2 | 1/2004 |

(Continued)

OTHER PUBLICATIONS

European Search Report mailed on May 14, 2009.

*Primary Examiner*—Minh Trinh
(74) *Attorney, Agent, or Firm*—Oliff & Berridge, PLC

(57) ABSTRACT

In a method, a first electrode is moved to contact with first paired ends of first paired conductor segments. Next, a second electrode is moved opposing the first paired ends Electric conduction is established between the first electrode and the second electrode via the first paired ends of the first paired conductor segments to weld the first paired ends of the first paired conductor segments based on the electrical conduction therebetween. Next, the second electrode is moved opposing second paired ends of second paired conductor segments while the first electrode is kept in contact with the first paired ends. Electric conduction is established between the first electrode and the second electrode via the welded first paired ends and the second paired ends to thereby weld the second paired ends of the second paired conductor segments based on the electrical conduction therebetween.

9 Claims, 9 Drawing Sheets

FOREIGN PATENT DOCUMENTS

| | | |
|---|---|---|
| JP | A 2000-166150 | 6/2000 |
| JP | A 2000-350421 | 10/2000 |
| JP | A 2000-350422 | 12/2000 |
| JP | A 2004-032897 | 1/2004 |
| JP | A 2004-328861 | 11/2004 |
| JP | A 2006-025544 | 1/2006 |
| JP | A 2006-502688 | 1/2006 |

* cited by examiner

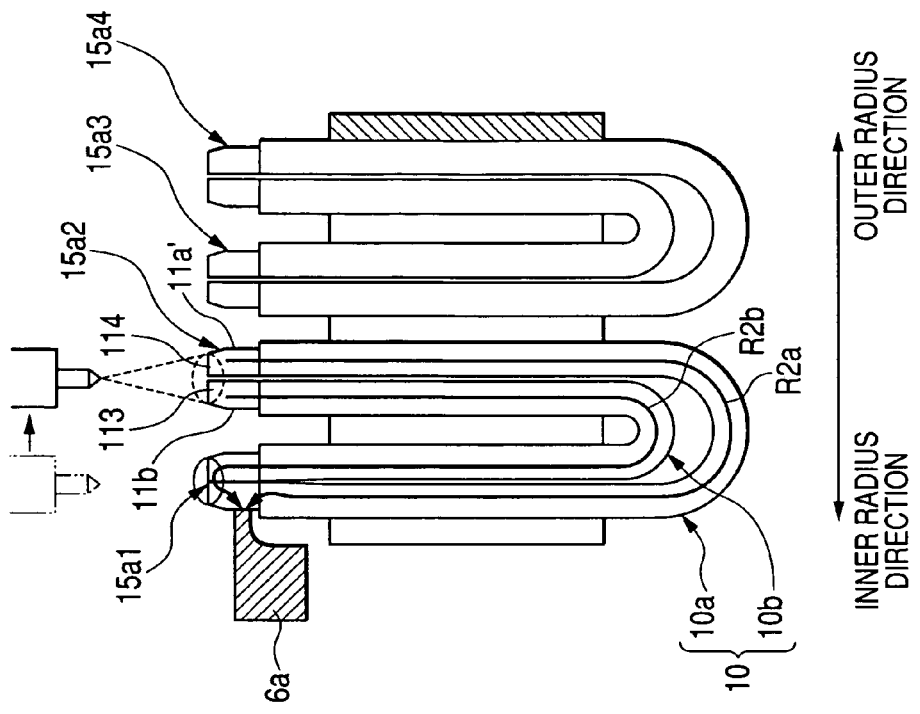
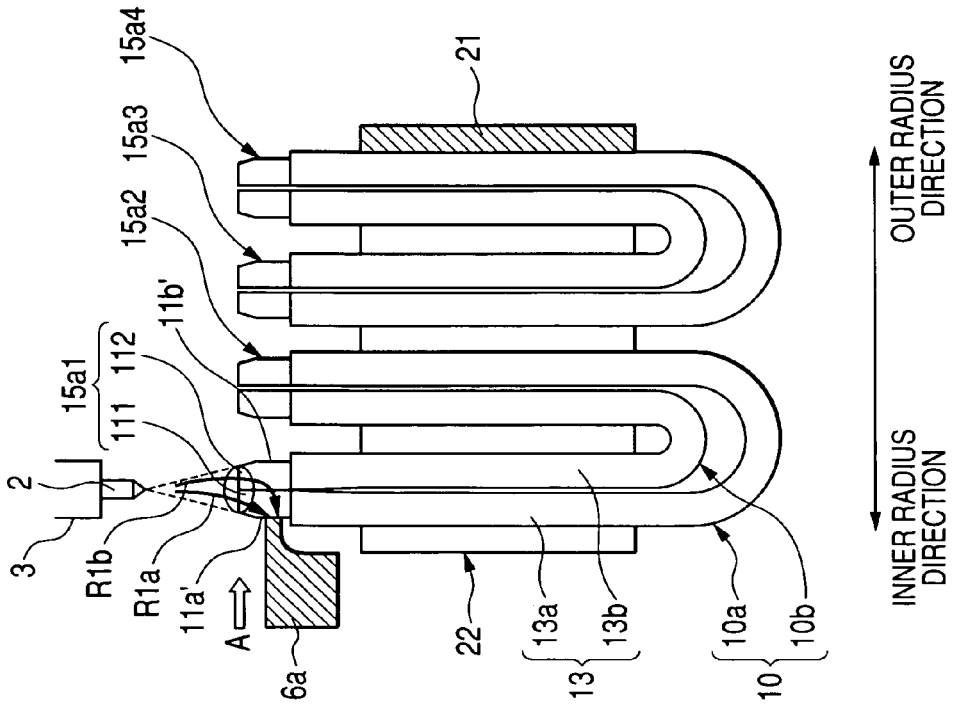

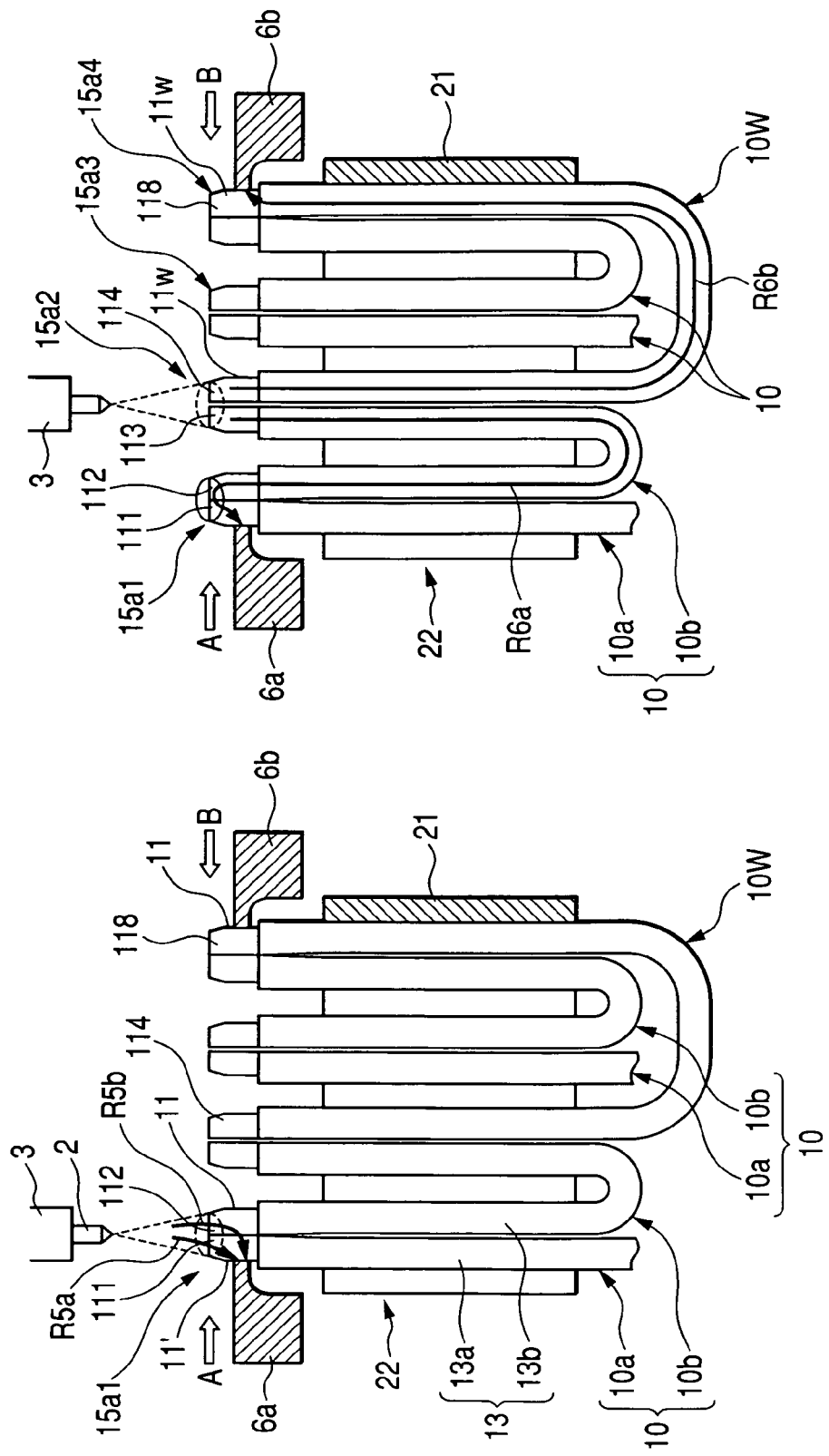

INNER RADIUS
DIRECTION

OUTER RADIUS
DIRECTION

METHOD OF JOINING A PLURALITY OF CONDUCTOR SEGMENTS TO FORM STATOR WINDING

CROSS REFERENCE TO RELATED APPLICATIONS

This application is based on Japanese Patent Application 2006-342830 filed on Dec. 20, 2006. This application claims the benefit of priority from the Japanese Patent Application, so that the descriptions of which are all incorporated herein by reference.

FIELD OF THE INVENTION

The present invention relates to methods of joining a plurality of conductor segments to form a stator winding of a stator; this stator is used for various rotational electric machines, such as alternators and motors.

BACKGROUND OF THE INVENTION

Rotary electric machines have been required to reduce the lengths (heights) between both stator coil ends of a stator from an annular cylindrical stator core thereof while increasing the winding packing factor of the stator. In order to meet the requirement, rotary electric machines, each of which installs therein an annular-shaped stator with a sequentially joined-segment stator coil, have been proposed.

The sequentially joined-segment stator coil includes a plurality of conductor segments, and each of the conductor segments consists of a pair of straight portions and a U-shaped turn portion joining the paired straight portions. A plurality of slots are circumferentially arranged in the stator core with given intervals.

One of the paired straight portions of one of the conductor segments is installed in one slot of a stator core and the other thereof is installed in another one slot thereof; these one slot and another slot are formed through the stator core to be circumferentially arranged with an interval corresponding to a substantially pole pitch of a rotor. One end of each of the straight portions of one of the conductor segments projecting from a corresponding slot is inclined in a circumferential direction of the stator core. Similarly, the remaining conductor segments are installed in corresponding pairs of slots of the stator core, respectively.

Joining the projecting end of each of the straight portions of each conductor segment installed in the stator core to the projecting end of a corresponding one of the straight portions of a corresponding one of the conductor segments installed in the stator core forms a continuous stator winding.

One example of methods of joining such conductor segments is disclosed in U.S. Pat. No. 6,698,083 B2 corresponding to Japanese Patent Application Publication No. 2000-350422.

In the U.S. Pat. No. 6,698,083, four straight portions of one and another one conductor segments are installed in a same slot of an annular cylindrical stator core in a radial direction thereof. The projecting end of each of the straight portions of each conductor segment installed in a slot of the stator core is sequentially joined to that of a corresponding one of the straight portions of a corresponding one of the conductor segments installed in another slot of the stator core. This results that at least one continuous stator winding of a stator coil is formed.

Specifically, as illustrated in FIG. 9, one projecting end of one large conductor segment 200a, one projecting end of one small conductor segment 200b to be joined thereto, one projecting end of another one large conductor segment 200a, and one projecting end of another one small conductor segment 200b are aligned in a radial direction of a stator core 210.

Note that the innermost projecting end of one large conductor segment 200a, the inner middle projecting end of one small conductor segment 200b, the outer middle projecting end of another one small conductor segment 200a, and the outermost projecting end of another one large conductor segment 200b are respectively referred to as "first projecting end 201", "second projecting end 202", "third projecting end 203", and "fourth projecting end 204". The first and second projecting ends 201 and 202 constitute an inner end pair 211, and the third and fourth projecting ends 203 and 204 constitute an outer end pair 212.

The first projecting end 201 is pressed toward a radially outer side by an inner ground electrode 205 located at the inner side of the stator core 210; this results that the first projecting end 201 and the second projecting end 202 are contacted to be electrically conducted therebetween to constitute the inner end pair 211. In this electrical conducting state, a welding torch 220 as a welding electrode of a welding system is arranged close to the inner end pair 211, and thereafter, arc discharge is carried out between the inner ground electrode 205 and the welding torch 220. This allows the first projecting end 201 and the second projecting end 202 to be respectively melted, and therefore, they are joined to each other.

Similarly, the fourth projecting end 204 is pressed toward a radially inner side by an outer ground electrode 206 located at the outer side of the stator core 210; this results that the fourth projecting end 204 and the third projecting end 203 are contacted to be electrically conducted therebetween to constitute the outer end pair 212. In this electrical conducting state, the welding torch 220 is arranged close to the outer end pair 212, and thereafter, arc discharge is carried out between the outer ground electrode 206 and the welding torch 220. This allows the fourth projecting end 204 and the third projecting end 203 to be respectively melted, and therefore, they are joined to each other.

Each of the conductor segments 200 is normally coated with an insulating film. In order to generate the arc discharge between the arc torch 220 and each of the inner and outer ground electrodes 205 and 206, electrical conduction between each of the conductor segments 200 and a corresponding one of the inner and outer ground electrodes 205 and 206 is needed. The insulating film located at one side of each of the first to fourth projecting ends 201 to 204 of the conductor segments 200 is eliminated before or after the insertion of each conductor segment 200 into a corresponding pair of slots of the stator core 210 with a cutter or chemical.

For example, the insulating film located at one side of each of the first to fourth projecting ends 201 to 204 of the conductor segments 200 is eliminated by cutting it or removing it by a chemical agent. Thereafter, the inner ground electrode 205 or the outer ground electrode 206 is directly contacted onto one side of each of the first to fourth projecting ends 201 to 204 of the conductor segments 200 so as to be directly conducted thereto; this allows an arc to be discharged therebetween.

This conductor-segment joining method disclosed in U.S. Pat. No. 6,698,083 is designed to alternators whose stator coils are each configured such that:

four straight portions of different conductor segments are installed in each of the slots of the stator core; and an inner end pair of projecting ends of respective straight portions of different conductor segments and an outer end pair of projecting ends of respective straight portions of different conductor segments are aligned in a radial direction of the stator core over each slot of the stator core. Note that such a configuration of a stator coil having four straight portions of different conductor segments installed in each slot and having the inner and outer coil end pairs will be referred to as "four-layer and two-row configuration" hereinafter.

Let us consider that the conductor-segment joining method disclosed in U.S. Pat. No. 6,698,083 is applied to high power output motors, such as motors for automobiles. In this application, the stator coil of the high power output motors are comprised of:

a great number of straight portions of different conductor segments are installed in each of the slots of the stator core; and a great number of pairs of projecting ends of respective straight portions of different conductor segments are aligned in a radial direction of the stator core over each slot of the stator core. Note that such a configuration of a stator coil having a great-number of straight portions of different conductor segments installed in each slot and having a great number of pairs of projecting ends will be referred to as "many-layer and many-row configuration" hereinafter.

The many-layer and many-row configuration of the stator coil can increase the number of turns of the stator coil in each phase.

In the many-layer and many-row configuration of the stator coil, a plurality of projecting ends are disposed between the inner end pair and the outer end pair. The conductor-segment joining method disclosed in U.S. Pat. No. 6,698,083 allows electrical conduction of the inner end pair and that of the outer end pair because of arrangement of each of the inner ground electrode 205 and the outer ground electrode 206. However, it may be difficult to establish electrical conduction of the plurality of projecting ends disposed between the inner end pair and the outer end pair using the inner and outer ground electrodes 205 and 206. Note that such plurality of projecting ends disposed between the inner end pair and the outer end pair will be referred to as intermediate projecting ends hereinafter.

Thus, in the many-layer and many-row configuration of the stator coil, how to establish electrical conduction between the middle projecting ends continues to be an important issue.

In order to address the important issue, first and second methods are proposed.

The first method includes the steps of:

arranging a pair of new intermediate ground electrodes at both circumferential sides of each pair of radially adjacent intermediate ground projecting ends;

causing the paired new electrodes to circumferentially clip the radially adjacent intermediate projecting ends of each pair so as to contact them; and discharging, with the use of a welding torch of an arc welding system, an arc between the paired new electrodes via the clipped radially adjacent intermediate projecting ends of each pair.

The second method includes the steps of:

arranging radially adjacent pairs of the intermediate projecting ends such that each of the radially adjacent pairs of the intermediate projecting ends is not radially aligned with another one of the radially adjacent pairs thereof and with each of the inner end pair and the outer end pair;

radially moving at least one of the inner and outer ground electrodes so as to make it contact to at least one of the radially adjacent intermediate projecting ends of each pair; and discharging, with the use of a welding torch, an arc between the at least one of the inner and outer ground electrodes and the welding torch.

In place of the radial moving step, the second method can include the following step:

radially extending at least one of the inner and outer ground electrodes so as to take it contact to at least one of the radially adjacent intermediate projecting ends of each pair.

The first method can keep the radial alignment of the plurality of projecting ends of respective straight portions installed in each slot of the stator core, making it possible to easily install the plurality of stator windings in the stator core.

The second method can easily carry out using such an arc welding without the need for another new intermediate electrode.

SUMMARY OF THE INVENTION

The first method however requires the step of arranging the pair of new intermediate electrodes at both circumferential sides of each pair of radially adjacent intermediate projecting ends. This arrangement step may cause the structure of the arc welding system including the arrangement of the inner and outer ground electrodes and the new intermediate electrodes to become complicated and great-sized.

The second method however requires the step of arranging radially adjacent pairs of the intermediate projecting ends such that each of the radially adjacent pairs of the intermediate projecting ends is not radially aligned with another one of the radially adjacent pairs thereof and with each of the inner end pair and the outer end pair. This arrangement step may cause the installation of the plurality of conductor segments in the stator core to become complicated.

Rotary electric machines, such as alternators and high power output motors, to be installed in motor vehicles are particularly desired to downsize themselves with maintaining high efficiency. Thus, in the rotary electric machines to be installed in motor vehicles, it is required to install a plurality of stator windings of a stator coil in each slot of a stator core with a density as high as possible and to reduce the lengths of both ends of the stator coil from the stator core.

In order to meet the requirements, the plurality of stator windings of the stator coil are each made of a plurality of plate-like conductor segments with a width as narrow as possible, and/or the number of turns of each of the stator windings is more increased. In addition, for satisfying the requirements, the number of joints of the plurality of conductor segments is more increased, and/or pitches between the respective adjacent projecting ends of the conductor segments are more reduced.

To implement these various means to meet the requirements, the conductor-segment joining methods set forth above are required to easily, rapidly, and stably join pairs of projecting ends of different conductor segments with high accuracy and a high degree of flexibility capable of addressing the narrow pitches between the respective adjacent projecting ends of the conductor segments.

Even if the stator coil has the many-layer and many-row configuration, it is strongly desired to provide a method of easily and rapidly joining pairs of projecting ends of different conductor segments without increasing either the number of components or processes required to join them.

In view of the foregoing circumstances, an object of at least one aspect of the present invention is to provide a method of easily and rapidly joining pairs of projecting ends of a plurality of conductor segments without increasing either the number of components or processes required to join them.

Accordingly, at least one aspect of the present invention provides a method of joining a plurality of conductor segments each inserted in at least one of a plurality of slots formed in a stator core. Each of the plurality of conductor segments has an end projecting from a corresponding at least one of the plurality of slots. The method includes the steps of:

(a) arranging the ends of the plurality of conductor segments such that a plurality of pairs of the ends of the plurality of conductor segments are formed, the plurality of pairs of the ends of the plurality of conductor segments including first paired ends and second paired ends, at least one of first paired conductor segments corresponding to the first paired ends included in the plurality of conductor segments and at least one of second paired conductor segments corresponding to the second paired ends included in the plurality of conductor segments being electrically conducted to each other;

(b) preparing a first electrode;

(c) preparing a second electrode;

(d) moving the first electrode so as to be in contact with at least part of the first paired ends of the first paired conductor segments;

(e) moving the second electrode so as to be opposite to the first paired ends of the first paired conductor segments;

(f) establishing electric conduction between the first electrode and the second electrode via the first paired ends of the first paired conductor segments so as to weld the first paired ends of the first paired conductor segments based on the electrical conduction therebetween;

(g) moving the second electrode so as to be opposite to the second paired ends of the second paired conductor segments while the first electrode is kept in contact with the at least part of the first paired ends of the first paired conductor segments; and (h) establishing electric conduction between the first electrode and the second electrode via the welded first paired ends of the first paired conductor segments and the second paired ends of the second paired conductor segments so as to weld the second paired ends of the second paired conductor segments based on the electrical conduction therebetween.

In preferred embodiment of this one aspect, a plurality of first sets of the first paired ends of the first paired conductor segments are aligned in a circumferential direction of the stator core with first pitches. A plurality of second sets of the second paired ends of the second paired conductor segments are aligned in a circumferential direction of the stator core with second pitches so as to be arranged radial outwardly from the plurality of first sets. A plurality of third sets of the second paired ends of the second paired conductor segments are aligned in a circumferential direction of the stator core with third pitches so as to be arranged radial outwardly from the plurality of second sets. A plurality of fourth sets of the first paired ends of the first paired conductor segments are aligned in a circumferential direction of the stator core with fourth pitches so as to be arranged radial outwardly from the plurality of third sets. The (d), (e), and (f) steps are carried out for each of the plurality of first sets of the first paired ends of the first paired conductor segments so that each of the plurality of first sets of the first paired ends of the first paired conductor segments is welded. The (g) and (h) steps are carried out for each of the plurality of second sets of the second paired ends of the first paired conductor segments so that each of the plurality of second sets of the second paired ends of the second paired conductor segments is welded after completion of the (d), (e), and (f) steps for each of the plurality of first sets. The (d), (e), (c), and (f) steps are carried out for each of the plurality of fourth sets of the first paired ends of the first paired conductor segments so that each of the plurality of fourth sets of the first paired ends of the first paired conductor segments is welded. The (g and (h) steps are carried out for each of the plurality of third sets of the second paired ends of the second paired conductor segments so that each of the plurality of third sets of the second paired ends of the second paired conductor segments is welded after completion of the (d), (e), and (f) steps for each of the plurality of fourth sets.

In preferred embodiment of this one aspect, the first electrode is a negative electrode and the second electrode is a positive electrode. The (f) step is configured to establish electric conduction between the negative electrode and the positive electrode via the first paired ends of the first paired conductor segments to generate arc discharge therebetween so as to weld the first paired ends of the first paired conductor segments based on the generated arc discharge. The (h) step is configured to establish electric conduction between the negative electrode and the positive electrode via the welded first paired ends of the first paired conductor segments and the second paired ends of the second paired conductor segments to generate arc discharge therebetween so as to weld the second paired ends of the second paired conductor segments based on the generated arc discharge.

In preferred embodiment of this one aspect, the welding of each of the plurality of first sets of the first paired ends of the first paired conductor segments, the welding of each of the plurality of second sets of the second paired ends of the second paired conductor segments, the welding of each of the plurality of fourth sets of the first paired ends of the first paired conductor segments, and the welding of each of the plurality of third sets of the second paired ends of the second paired conductor segments form at least one continuous stator winding to be installed in stator core.

In preferred embodiment of this one aspect, one of: at least one of the first paired conductor segments of the plurality of first sets, and at least one of the second paired conductor segments of the plurality of second sets serves as a crossover conductor segment connected to one of: at least one of the first paired conductor segments of the plurality of fourth sets, and at least one of the second paired conductor segments of the plurality of third sets.

In preferred embodiment of this one aspect, the plurality of first sets of the first paired ends of the first paired conductor segments, the plurality of second sets of the second paired conductor segments, the plurality of third sets of the second paired ends of the second paired conductor segments, and the plurality of fourth sets of the first paired ends of the first paired conductor segments are radially aligned with each other, and the first, second, third, and fourth pitches are set to be equal to each other.

BRIEF DESCRIPTION OF THE DRAWINGS

Other objects and aspects of the invention will become apparent from the following description of embodiments with reference to the accompanying drawings in which:

FIG. 5A is a partially enlarged sectional view schematically illustrating how to weld the first tip-end pair illustrated in FIG. 4 according to the first embodiment;

FIG. 5B is a partially enlarged sectional view schematically illustrating how to weld the second tip-end pair illustrated in FIG. 4 according to the first embodiment;

FIG. 7A is a partially enlarged sectional view schematically illustrating how to weld the first tip-end pair according to a modification of the first embodiment;

FIG. 7B is a partially enlarged sectional view schematically illustrating how to weld the second tip-end pair according to the modification of the first embodiment;

DETAILED DESCRIPTION OF EMBODIMENTS OF THE INVENTION

Embodiments of the present invention will be described hereinafter with reference to the accompanying drawings.

First Embodiment

Figure 1:
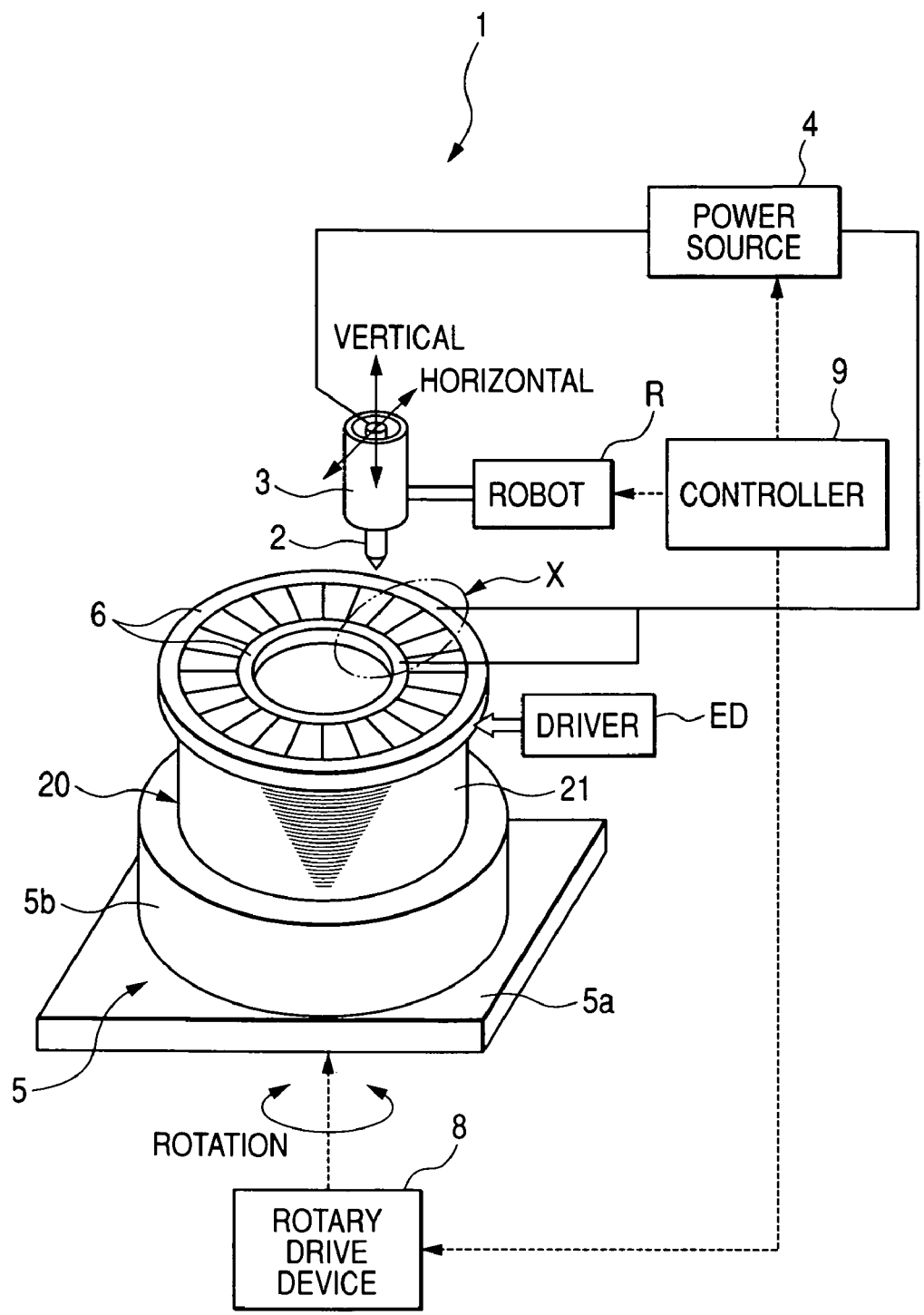
FIG. 1 is an enlarged perspective view schematically illustrating a welding system for welding a plurality of conductor segments of a stator according to a first embodiment of the present invention.

Referring to the drawings, in which like reference characters refer to like parts in several views, particularly to FIG. 1, there is illustrated a welding system 1. For example, as the welding system 1, a TIG welding system is used.

The welding system 1 includes a substantially cylindrical welding torch 3 integrated with a bar-shaped welding electrode (positive electrode) 2. The welding electrode 2 is supported in the welding torch 3 in its axial direction such that one end portion of the welding electrode 2 projects from one end wall of the welding torch 3.

The welding system 1 includes a welding power source 4 for supplying power to the welding electrode 2, and a supporting table 5 having a two dimensional mount surface 5a.

An annular cylindrical stator core 21 of a stator 20 is supported by an inner periphery of an annular cylindrical support 5b of the supporting table 5 fixedly mounted on the mount surface 5a; this stator 20 is a work to be welded.

The welding system 1 also includes a pair of ground electrode members 6 for establishing electrical conduction between the work and the welding electrode 2.

The welding system 1 further includes a robot R serving as a horizontal and vertical driver.

The robot R is designed as, for example, a multijoint arm robot whose a mechanical hand (mechanical gripper) grips the welding torch 3 as an example of various types of tools. The robot R is programmed to move the mechanical hand, that is, the welding torch 3 in a horizontal direction parallel to the horizontal mount surface 5a and in a vertical direction orthogonal to the horizontal direction; these horizontal direction and vertical direction constitute a torch working space (torch movable space).

The welding system 1 includes an electrode driver ED mechanically linked to each of the inner and outer ground electrode members 6 and working to move it in the torch working space.

The welding system 1 includes a rotary drive device 8 mechanically linked to the table 5 and working to rotate the table 5a so as to rotate the stator 20 around the center axis of its stator core 21.

The welding system 1 further includes a controller 9 composed of a microcomputer and its peripheries.

The controller 9 is programmed to:

control the power supply timing and the supplied power level of the welding power source;

control the robot R so as to move a tip end 2a of the one end portion of the welding electrode 2 to predetermined points in the torch working space;

control the electrode driver ED so as to move each of the ground electrode members 6; and rotate the table 5 and the stator 20 by arbitrary angles around the center axis of the stator core 21.

The welding electrode 2 is made of, for example, tungsten. In the first embodiment, the welding torch 3 is connected to a positive electrode of the welding power source 4; this welding torch 3 serves as a positive electrode of the welding system 1.

Inactive gas is configured to be supplied to the tip-end side of the welding electrode 2 through the inside of the welding torch 3; this inactive gas works to shield a work to be welded to thereby stabilize an arc to be generated and protect the oxidation of the portion to be welded.

Specifically, in response to sequential instructions sent from the controller 9, the robot R sequentially moves the welding torch 3 to positions in the torch working space. When the torch 3 is located at each of the positions, the tip end 2a of the welding electrode 2 is located close to a corresponding pair of projecting ends of straight portions of different conductor segments installed in the stator core 21 of the stator 20.

When the tip end 2a of the welding electrode 2 is located at a corresponding pair of projecting ends of straight portions of different conductor segments installed in the stator core 21, power is supplied from the welding power source 4 to the welding torch 3 under control of the controller 9. This allows an arc discharge to be carried out so as to join the pair of projecting ends of portions of different conductor segments installed in the stator core 21 of the stator 20.

Figure 2:
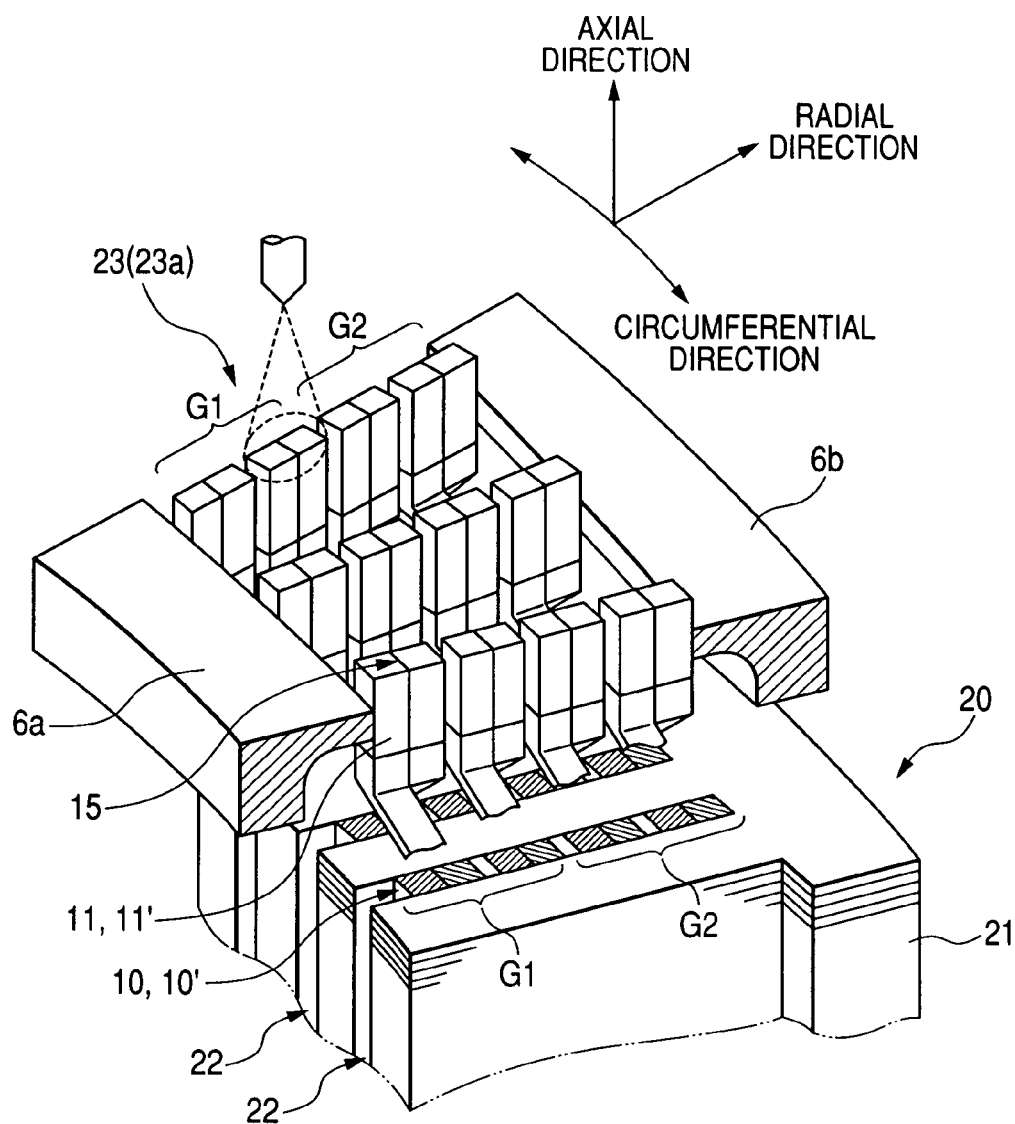
FIG. 2 is an enlarged perspective view of a circled portion of the stator indicated by an arrow X in FIG. 1.

As illustrated in FIG. 2, the stator 20 as a work to be welded is composed of the annular cylindrical stator core 21. The stator core 21 for example consists of a plurality of annular core sheets laminated in their axial directions; each of these core sheets is made of a magnetic material, such as an iron steel.

The stator core 21 has a plurality of slots 22. The slots 22 are formed through the stator core 21 and circumferentially arranged at given intervals (slot pitches). Each of the slots 22 is radially arranged.

The stator 20 is composed of a stator coil 23 consisting of, for example, three-phase stator windings wound in the slots 22 of the stator core 21. The three-phase stator windings 23a are connected to each other at a neutral point to form, for example, star configuration. A lead is pulled out of one end of each of the three-phase stator windings 23a, and the leads of the three-phase stator windings 23a are connected to an inverter/rectifier.

The stator 20 is used to be installed in a rotary electric machine such that the stator 20 is arranged opposing a rotor of the rotary electric machine. The pair of rotor and the stator 20 serves as:

a synchronous motor in which the rotor is rotated based on a rotating magnetic field created by the three-phase alternating currents supplied to the three-phase windings 23a of the stator coil 23 from the inverter/rectifier; and/or an alternator in which magnetic fluxes created by the rotation of the rotor (pole rotor) induce a three-phase AC voltage in the stator coil 23; this induced three-phase AC voltage is rectified by the inverter/rectifier to be output as a DC voltage.

Figure 3:
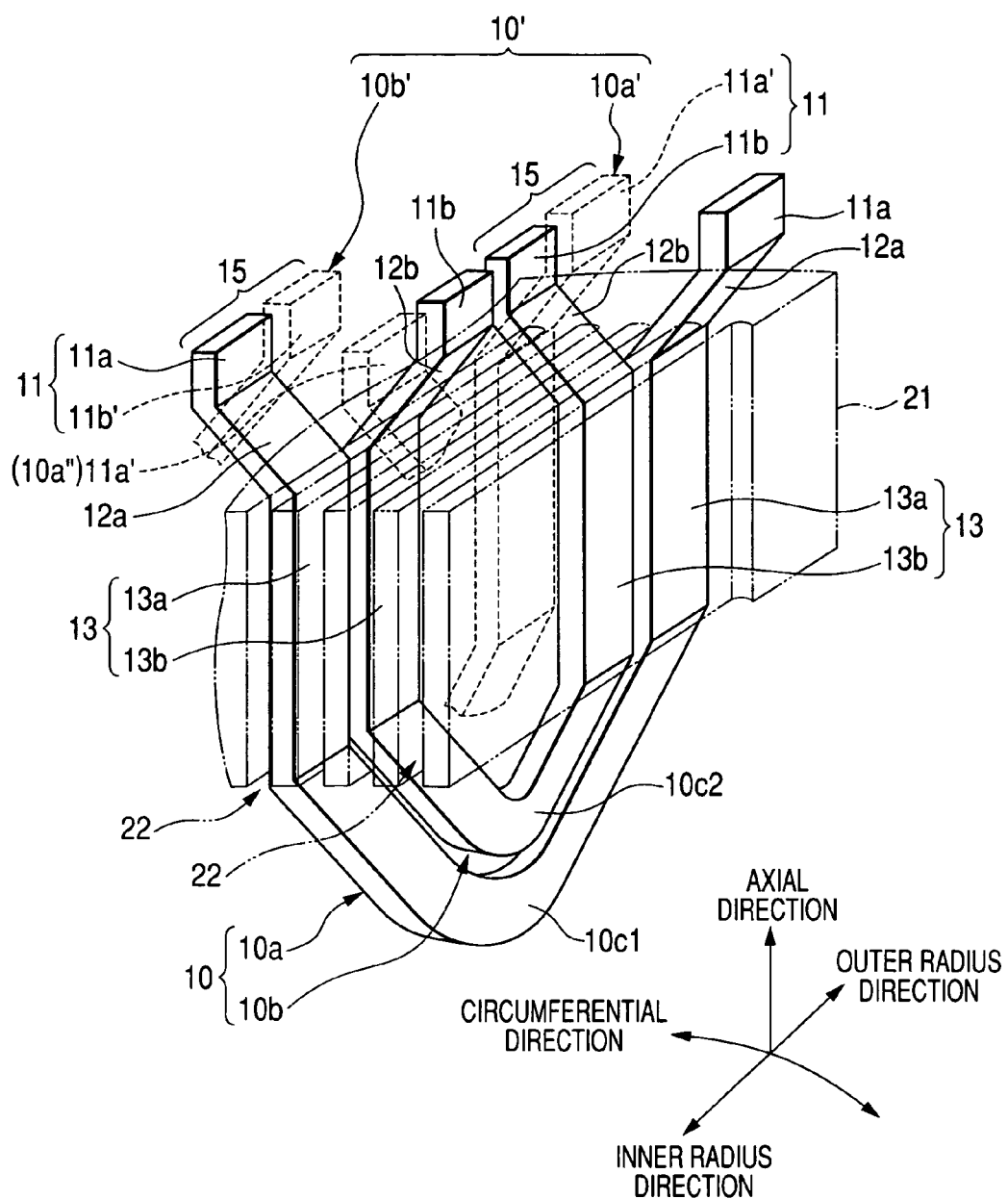
FIG. 3 is an enlarged perspective view schematically illustrating large and small conductor segments constituting a stator coil of the stator illustrated in FIG. 2.

Each of the three-phase stator windings 23a of the stator coil 23 is made up of sequentially joined conductor segments 10 placed within the slots 22 of the stator core 21 (see FIG. 3).

Such a stator coil structure has been well known in, for example, U.S. Pat. Nos. 6,201,332 B1, 6,249,956 B1, 6,404,091 B1, and 6,885,123 B2. Because all of the U.S. patents are assigned to the same assignee as that of this application, disclosures of these patents are incorporated herein by reference.

Each of the conductor segments 10 has a substantially long plate-like U or V shape, and is covered with an insulation film, such as a resinous film, except for tip ends 11 thereof.

The conductor segments 10 is composed of a pair of straight portions and a U- or V-shaped turn portion such that the paired straight portions extending at their one ends from ends of the turn portion; these straight portions are to be inserted into the slots 22.

Each of the conductor segments 10 is also composed of paired slant portions continuing from the other ends of the straight portions and paired tip ends continuing from the respective paired slant portions. The paired slant portions and paired tip ends project outside the slots 22 when the straight portions are placed within the slots 22.

The turn portion of each of the conductor segments 10 connects both the one ends of the paired straight portions of each of the conductor segments 10.

The total lengths of the conductor segments 10 in their longitudinal directions are different from each other, one of which is longer than the other.

In the first embodiment, as illustrated in FIG. 3, one of the conductor segments 10 larger in length than the other thereof is referred to as a large conductor segment 10a; the other of the conductor segments 10 is referred to as a small conductor segment 10b. Each pair of the large conductor segment 10a and the small conductor segment 10b will be also referred to as a segment set hereinafter.

Specifically, the large conductor segment 10a consists of the turn portion 10c1, the paired straight portions 13a, the paired slant portions 12a, and the paired tip ends (legs) 11a. The tip ends 11a of the large conductor segment 10a serve as portions to be welded.

Each of the large conductor segments 10a is bent at the turn portion 10c1 by a predetermined electrical angle in a circumferential direction of the stator core 21 such that the paired straight portions 13a are away from each other. This bending of each of the large conductor segments 10a allows the paired straight portions 13a to be inserted in corresponding paired slots 22 of the stator core 21; these corresponding paired slots 22 are arranged circumferentially away from each other with, for example, a pole pitch of the rotor.

The insertion of each of the large conductor segments 10a into the corresponding paired slots 22 from one annular end surface of the stator core 21 causes paired one end portions corresponding to the slant portions 12a and the legs 11a to project from the other annular end surface of the stator core 21 by predetermined lengths. The one end portions each of the large conductor segments 10a are bent by a predetermined electrical angle in a circumferential direction of the stator core 21 so as to be away from each other to form the paired slant portions 12a, respectively. The tip ends of the slant portions 12a are bent such that they extend parallel to the axial direction of the stator core 21; these tip ends serve as the paired legs 11a of each of the large conductor segment 10a to be welded.

Preferably, each of the legs 11a is arranged to be circumferentially away from a corresponding one of the straight portions 13a of each of the large conductor segments 10a by the half of the pole pitch of the rotor.

The small conductor segment 10b consists of the turn portion 10c2, the paired straight portions 13b, the paired slant portions 12b, and the paired tip ends (legs) 11b. The tip ends 11b of the small conductor segment 10b serve as portions to be welded.

Each of the small conductor segments 10b is bent at the turn portion 10c2 by a predetermined electrical angle in a circumferential direction of the stator core 21 such that the paired straight portions 13b are away from each other so as to be inserted in corresponding paired slots 22 of the stator core 21. The corresponding paired slots 22 are arranged circumferentially away from each other with, for example, the pole pitch of the rotor.

Each of the small conductor segments 10b is bent at the turn portion 10c2 by a predetermined electrical angle in a circumferential direction of the stator core 21 such that the paired straight portions 13b are away from each other. This bending of each of the small conductor segments 10b allows the paired straight portions 13b to be inserted in corresponding paired slots 22 of the stator core 21; these corresponding paired slots 22 are arranged circumferentially away from each other with, for example, the pole pitch of the rotor.

The insertion of each of the small conductor segments 10b into the corresponding paired slots 22 from one annular end surface of the stator core 21 causes paired one end portions corresponding to the slant portions 12b and the legs 11b to project from the other annular end surface of the stator core 21 by predetermined lengths. The one end portions each of the small conductor segments 10b are bent by a predetermined electrical angle in a circumferential direction of the stator core 21 so as to be close to each other to form the paired slant portions 12b, respectively. The tip ends of the slant portions 12b are bent such that they extend in parallel to the axial direction of the stator core 21 and are radially aligned with each other; these tip ends serve as the paired legs 11b of each of the small conductor segment 10b to be welded.

Preferably, each of the legs 11b is arranged to be circumferentially away from a corresponding one of the straight portions 11b of each of the small conductor segments 10b by the half of the pole pitch of the rotor.

As illustrated in FIG. 3, the large and small conductor segments 10a and 10b become paired. One of the paired straight portions 13a and one of the paired straight portions 13b of one pair of the large and small conductor segments 10a and 10b are inserted into one slot 22. The other of the paired straight portions 13a and the other of the paired straight portions 13b of the one pair of the large and small conductor segments 10a and 10b are inserted into another one slot 22. The one and another one slots 22 become a first pair of the slots 22 such that they are circumferentially arranged to be away from each other by the pole pitch of the rotor.

As illustrated in FIG. 3, each reference number with no dash and that with a dash (') are assigned to the identical portions of different large conductor segments 10a. Similarly, each reference number with no dash and that with a dash (') are assigned to the identical portions of different small conductor segments 10b.

Similarly, into a second pair of the slots 22 adjacent to one circumferential side of the first pair of slots 22, the large and small conductor segments 10a' and 10b' of another one pair are inserted as in the case of one pair of the large and small conductor segments 10a and 10b (see FIG. 3).

Moreover, into a third pair of the slots 22 adjacent to the other circumferential side of the first pair of slots 22, the large and small conductor segments (see reference character 10a'' in FIG. 3) of a further one pair are inserted as in the case of one pair of the large and small conductor segments 10a and 10b.

In his installation of the one pair (10a, 10b) and another one pair (10a', 10b') of the large and small conductor segments, the straight portions 13a and 13b of the one pair of the conductor segments 10a and 10b and those of another one pair of the large and small conductor segments 10a' and 10b' are inserted in one same slot 22.

In this installation of the one pair (10a, 10b), another pair (10a', 10b'), and the further one pair of the large and small conductor segments, the radially adjacent legs 11b of the small conductor segment 10b of the one pair, the leg 11a' of the large conductor segment 10a' of another one pair, and the leg 11a' of the large conductor segment 10a'' of the further one pair are radially aligned with each other.

Specifically, in this installation of the one pair (10a, 10b), another pair (10a', 10b'), and the further one pair of the large and small conductor segments, four layered straight portions in one same slot 22 and four radially adjacent tip ends 11a', 11b, 11b, and 11a' are provided.

In other words, in this installation of the one pair (10a, 10b) another pair (10a', 10b') of the large and small conductor segments, and the further one pair of the large and small conductor segments, four layered straight portions in one same slot 22, a first pair of radially adjacent tip ends 11a' and 11b, and a second pair of radially adjacent tip ends 11b and 11a' are provided.

Similarly, into respective pairs of the slots 22 circumferentially adjacent to each other, the large and small conductor segments 10a and 10b of the remaining pairs are inserted as in the case of one pair of the large and small conductor segments 10a and 10b (see FIG. 3).

As illustrated in FIG. 2, this results that the stator coil 23 (three-phase stator windings 23a) are configured such that:

a first group G1 of a plurality of sets of the four layered straight portions 13 and a plurality of sets of the first and second pairs of tip ends 11, 11' are circumferentially arranged in a concentric pattern; and a second group G2 of a plurality of sets of the four layered straight portions 13 and a plurality of sets of the first and second pairs of tip ends 11, 11' are circumferentially arranged in a concentric pattern.

In the first embodiment, the first group G1 is arranged in an inner radius side of the stator core 21, and the second group G2 is arranged in an outer radius side thereof.

This configuration of the stator coil 23 illustrated in FIG. 2 will be referred to as "eight-layer and four-row configuration" hereinafter. In contrast, assuming that the stator coil 23 consists of any one of the first and second groups, the configuration of the stator coil 23 can be referred to as "four-layer and two-row configuration".

The radially adjacent tip ends 11a' and 11b of each first pair respectively constitute a tip-end pair 15 freely projecting from the other annular end surface of the stator core 21. For this reason, the radially adjacent tip ends 11a' and 11b of each first pair are not necessarily closely contacted to each other. Similarly, the radially adjacent tip ends 11a and 11b' of each second pair constitute a tip-end pair 15 freely projecting from the other annular end surface of the stator core 21. For this reason, the radially adjacent tip ends 11a' and 11b of each first pair are not necessarily closely contacted to each other. The same is true in the radially adjacent tip ends 11a and 11b' of each second pair.

Preferably, the pole pitch of the rotor can be set to an odd-number times as long as the number of slots 22; this allows each of the tip-end pairs 15 to be arranged over one pitch of corresponding adjacent slots 22. As a result, the tip-end pairs 15 are circumferentially and radially aligned with each other at the same pitches. Specifically, four tip-end pairs 15 are aligned with each other at the same pitches in a corresponding radial direction of the stator core 21, and the tip-end pairs 15 are circumferentially arranged in a four-layered concentric pattern.

Figure 4:
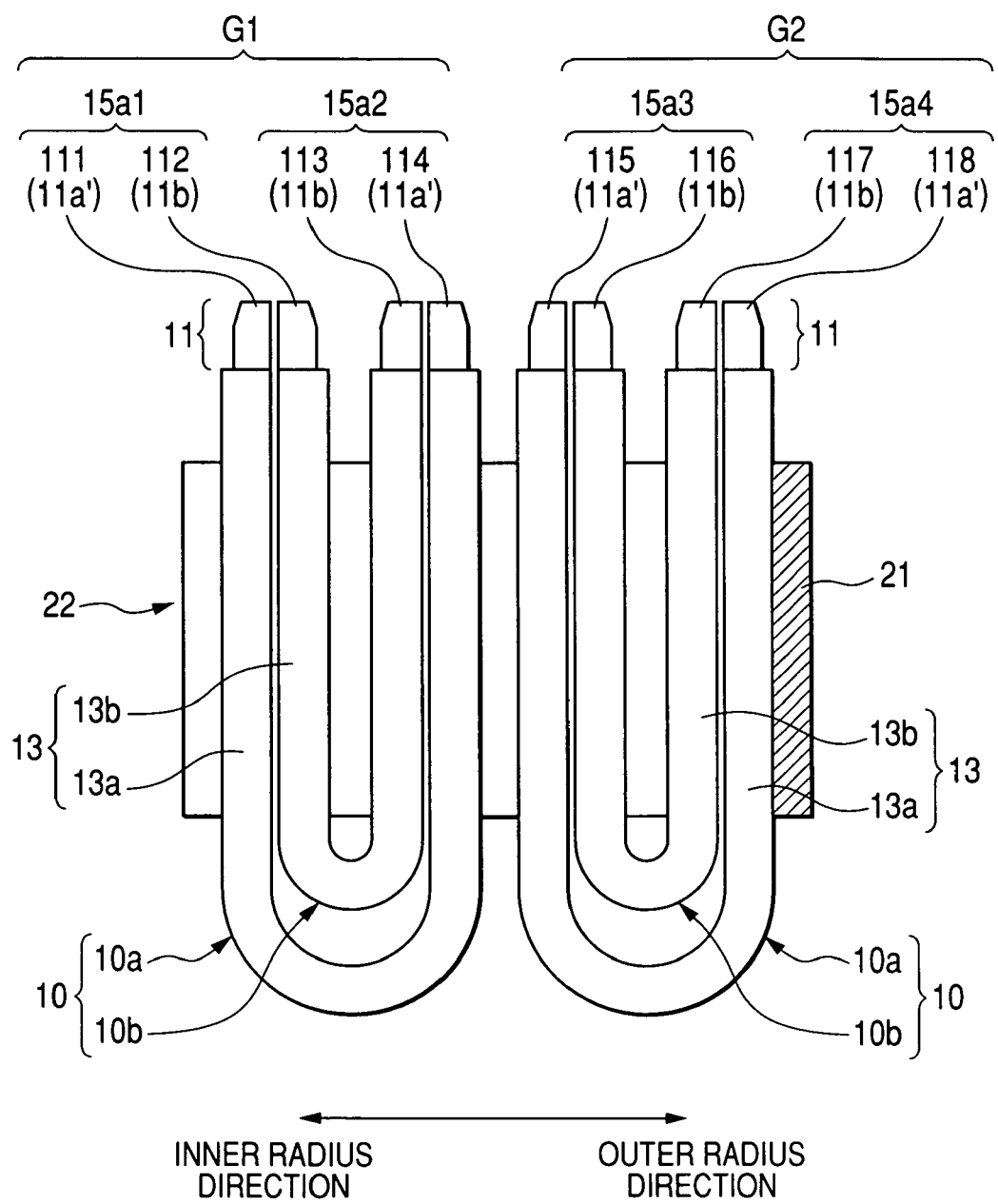
FIG. 4 is an enlarged partially schematic sectional view illustrating eight layered straight portions and first to four tip-end pairs of one set of the stator coil according to the first embodiment.

FIG. 4 is an enlarged partially schematic sectional view illustrating one set of four layered straight portions 13a, 13b, a first pair of radially adjacent tip ends 11a' and 11b, and a second pair of radially adjacent tip ends 11b and 11a' of each of the first and second groups G1 and G2. In FIG. 4, the four layered straight portions 13a, 13b of each of the first and second groups G1 and G2 are summarized to be installed in one slot 22 for the purpose of simplification in illustration.

As illustrated in FIG. 4, in each of the first and second groups G1 and G2, four straight portions (first, second, third, and fourth straight portions) 13 are installed in one slot 22 to be radially aligned with each other.

In addition, four tip-end pairs 15 of the first group G1 and the second group G2 are aligned with each other in a radial direction of the stator core 21. The radially arranged four tip-end pairs 15 of the first and second groups G1 and G2 are configured to equally project in one plane; this configuration allows continuous welding to be easily carried out.

The edges of the tip ends of each tip-end pair 15 are welded to each other using an arc welding; this forms each of the continuous three-phase stator windings 23a.

Note that, because the straight portion 13 of each of the conductor segments 10 is coated with an insulating film (not shown), four straight portions 13 of each of the first and second groups G1 and G2 are installed in one same slot 22 to be in close contact with each other, this can increase the coil space factor.

In contrast, the radially arranged four tip-end pairs 15 of the first and second groups G1 and G2 are arranged at regular intervals to establish electrical insulation therebetween.

The turn portions 10c1 and 10c2 of the large and small conductor segments 10a and 10b of each pair can be circumferentially inclined so as to reduce the axial length between both the stator-coil ends.

As described above, the stator coil 23 has the eight-layer and four-row configuration as illustrated in FIGS. 2 and 4. When the stator 20 is used to a rotary electric machine to be installed in higher-output apparatuses, such as motor vehicles, the stator coil 23 has a many-layer and many-row configuration in order to increase the number of turns thereof in each phase. The number of tip-end pairs 15 is determined by the half of the number of layers of the straight portions to be installed in each slot 22. Specifically, the more the number of layers of the straight portions 13 in each slot 22 increases, the more the number of portions of the stator 20 to be welded. Specifically, the number of portions of the stator 20 to be welded is represented as the product of the number of rows of the tip-end pairs 15 in a radial direction of the stator core 21 and the number of circumferential pitches of the tip-end pairs 15.

For this reason, the number of portions of the stator 20 to be welded becomes greater with increase in the number of layers of the straight portions to be installed in each slot 22. Thus, it is strongly desired to provide a method of easily and rapidly joining the tip ends 11 and 11' of each tip-end pair 15.

Note that, if there is a gap between the tip ends 11 and 11' of at least one tip-end pair 15 and the gap is greater than a certain level, a holding jig can be used to hold the tip ends 11 and 11' of at least one tip-end pair 15 so as to reduce the gap therebetween.

In the first embodiment, the tip end 11a' of one first pair of the first group G1 located at the innermost side of a radial direction of the stator core 21 will be referred to as "first tip end 111" hereinafter. The tip end 11b of the one first pair of the first group G1 located radial outwardly adjacent to the first tip end 111 in a radial direction will be referred to as "second tip end 112". The pair of the first and second tip-ends 111 and 112 will be referred to as "first tip-end pair 15a1" hereinafter.

The tip end 11b of one second pair of the first group G1 located radial outwardly adjacent to the second tip end 112 will be referred to as "third tip end 113". The tip end 11a' of the one second pair of the first group G1 located radial outwardly adjacent to the third tip end 113 will be referred to as "fourth tip end 114". The pair of the third and fourth tip-ends 113 and 114 will be referred to as "second tip-end pair 15a2" hereinafter.

The tip end 11a' of one first pair of the second group G2 located radial outwardly adjacent to the fourth tip end 114 will be referred to as "fifth tip end 115". The tip end 11b of the one first pair of the second group G2 located radial outwardly adjacent to the fifth tip end 115 will be referred to as "sixth tip end 116". The pair of the fifth and sixth tip-ends 115 and 116 will be referred to as "third tip-end pair 15a3" hereinafter.

The tip end 11b of one second pair of the second group G2 located radial outwardly adjacent to the sixth tip end 116 will be referred to as "seventh tip end 117". The tip end 11a' of the one second pair of the second group G2 located radial outwardly adjacent to the seventh tip end 117 will be referred to as "eighth tip end 118". The pair of the seventh and eighth tip-ends 117 and 118 will be referred to as "fourth tip-end pair 15a4" hereinafter.

The second tip-end pair 15a2 and the third tip-end pair 15a3 arranged intermediate between the first tip-end pair (innermost tip-end pair) 15a1 and the fourth tip-end pair (outermost tip-end pair) 15a4 will be referred to as "intermediate tip-end pairs 15a2 and 15a3" hereinafter.

As described above, the first to fourth tip-end pairs 15a1 to 15a4 are radially arranged at regular intervals to establish electrical insulation therebetween.

Referring to FIG. 1, after each of the conductor segments 10a and 10b has inserted into the corresponding paired slots 22 of the stator core 21 from the one annular end surface thereof, the stator core 21 is inserted at its one annular end side into the inner periphery of the annular cylindrical support 5b fixedly mounted on the mount surface 5a of the supporting table 5. This allows a plurality of sets of the first to eighth tip ends 111 to 118 to be in upward direction with respect to the mount surface 5a of the supporting table 5.

The insulating film coated around each of the first to eight tip ends 111 to 118 of each set is eliminated before or after the insertion of each of the conductor segments 10a and 10b has inserted into the corresponding paired slots 22 of the stator core 21 with a cutter or chemical.

Next, a conductor-segment joining method according to the first embodiment using the welding system 1 will be described hereinafter.

As described above, the welding system 1 is equipped with the pair of the ground electrode members 6.

The ground electrode members 6 consist of a plurality of inner ground electrodes (inner negative electrodes) 6a located opposing the inner periphery of the stator core 21 to be arranged in a circumferential direction of the inner periphery thereof with regular intervals corresponding to the pole pitches of the rotor. Each of the plurality of inner ground electrodes 6a has a substantially annular cylindrical shape as a whole.

Similarly, the ground electrode members 6 consist of a plurality of outer ground electrodes (outer negative electrodes) 6b located opposing the outer periphery of the stator core 21 to be arranged in a circumferential direction of the outer periphery thereof with regular intervals corresponding to the pole pitches of the rotor. Each of the plurality of outer ground electrodes 6b has a substantially annular cylindrical shape as a whole.

Under control of the controller 9, the electrode driver ED works to move at least one of the plurality of inner ground electrodes 6a to be in contact with the first tip end 111 of the first tip-end pair 15a1; this allows electrical conduction between the welding electrode 2 and the first tip-end pair 15a1.

Under control of the controller 9, the electrode driver ED also works to move at least one of the plurality of outer ground electrodes 6b to be in contact with the eighth tip end 118 of the fourth tip-end pair 15a4; this allows electrical conduction between the welding electrode 2 and the fourth tip-end pair 15a4.

In the first embodiment, except for the inner and outer ground electrodes 6a and 6b, the welding system 1 is equipped with no ground electrodes specifically for establishing electrical conduction between the welding electrode 2 and each of the second and third tip-end pairs 15a2 and 15a3.

Specifically, the conductor-segment joining method according to the first embodiment is designed to enable electrical conduction between the welding electrode 2 and each of the second and third tip-end pairs 15a2 and 15a3 with the use of the inner and outer ground electrodes 6a and 6b and previously joined intervening conductor segments 10 without requiring any ground electrodes for directly grounding the second and third tip-end pairs 15a2 and 15a3.

Next, sequential steps (processes) of the conductor-segment joining method according to the first embodiment will be specifically described hereinafter with reference to FIGS. 5A, 5B, 5C, and 5D. Each of FIGS. 5A, 5B, 6A, and 6B schematically illustrate one set of the first to fourth tip-end pairs 15a1 to 15a4 aligned in a radial direction of the stator core 21 of the stator 20 with the eight-layer and four-row configuration. In FIG. 4, eight strait portions 13 (13a, 13b) corresponding to the first to eighth tip ends 111 to 118 are summarized to be installed in one slot 22 for the purpose of simplification in illustration.

First Welding Step

The stator 20 is mounted at its stator core 21 in the support 5b mounted on the mount surface 5a of the table 5 such that the plurality of sets of the first to eighth tip ends 111 to 118 is in upward direction with respect to the mount surface 5a thereof preparatory to the conductor-segment joining method.

When the first and second tip end pairs 111 and 112 of one first tip-end pair 15a1 of conductor segments 10a and 10b installed in corresponding slots 22 of the stator core 21 is welded to each other, an inner ground electrode 6a corresponding to the one first tip-end pair 15a1 is selected to be moved by the electrode driver ED toward the first tip end 111 under control of the controller 9.

When contacting to one side of the first tip end 111 of the first tip-end pair 15a1, the inner ground electrode 6a is further moved radial outwardly in a direction indicated by an arrow "A" in FIG. 5A. The radial outward movement of the inner ground electrode 6a presses the first tip end 111 radial outwardly so that the first tip end 111 comes close to the second tip end 112 or contacts thereonto.

Next, under control of the controller 9, the robot R moves the welding torch 3 so that the tip end 2a of the welding electrode 2 is located over the first tip-end pair 15a1 with a predetermined gap therebetween.

Next, under control of the controller 9, power with adjusted level is supplied from the welding power source 9 to the welding electrode 2. Because the first tip end 111 is in contact with the inner ground electrode 6a so that electrical conduction therebetween is established, arch discharge is created between the welding electrode 2 and the first tip end 111 (inner ground electrode 6a). This allows an arc current R1a to flow between the welding electrode 2 and the inner ground electrode 6a through the first tip end 111.

The created arc discharge between the welding electrode 2 and the first tip end 111 allows the first tip end 111 to become molten. When the molten area of the first tip end 111 is increased, the molten metal is started to be in contact with the second tip end 112 so that the second tip end 112 is grounded. This allows an arc current R1b to flow between the welding electrode 2 and the inner ground electrode 6a through the first and second tip ends 111 and 112 to whereby the second tip end 112 becomes molten, and thereafter, the molten area of the second tip end 112 is increased.

As a result, the molten first and second tip ends 111 and 112 are welded to each other.

If a radial gap between the first tip end 111 and the second tip end 112 exceeds a predetermined limit length, it may be difficult to stably and strongly weld them. Note that the limit length for the gap is substantially proportional to a lateral cross sectional area of the conductor segment 10.

Thus, in the first embodiment, an adequate level of pressing force is applied to the first tip end 111 by the movement of the inner ground electrode 6a so that the first tip end 111 comes close to the second tip end 112. This allows the gap between the first tip end 111 and the second tip end 112 to lie within the predetermined limit length to thereby stably weld the first and second tip ends 111 and 112 to each other.

Preferably, an adequate level of pressing force is applied to the first tip end 111 by the movement of the inner ground electrode 6a so that the first tip end 111 is in contact with the second tip end 112. This allows arch discharge to be created both between the welding electrode 2 and the first tip end 111 and between the welding electrode 2 and the second tip end 112. This results that an arc current immediately flows between the welding electrode 2 and the inner ground electrode 6a through the first and second tip ends 111 and 112, and therefore, an molten area of each of the first and second tip ends 111 and 112 is rapidly increased, making it possible to immediately and stably weld them.

The pressing force to be applied to the first tip end 111 by the movement of the inner ground electrode 6a has not necessarily a level that allows the second tip end 112 to be radial outwardly pressed down, and has a level that allows the gap between the first and second tip ends 111 and 112 to be reduced. The gap between the first tip-end pair 15a1 and the second tip-end pair 15a2 can be therefore prevented from being eliminated.

Second Welding Step

After the first welding step, welding of the third and fourth tip ends 113 and 114 of one second tip-end pair 15a2 adjacent to the previously joined first tip-end pair 15a1 is carried out.

Specifically, after completion of the welding of the first tip-end pair 15a1, the inner ground electrode 6a is kept to be in contact with the one side of the first tip end 111 of the previously joined first tip-end pair 15a1.

At that time, while the inner ground electrode 6a is kept to be in contact with the one side of the first tip end 111 of the previously joined first tip-end pair 15a1, the robot R moves the welding torch 3 so that the tip end 2a of the welding electrode 2 is located over the second tip-end pair 15a2 with a predetermined gap therebetween under control of the controller 9 (see FIG. 5B).

Next, under control of the controller 9, power with adjusted level is supplied from the welding power source 9 to the welding electrode 2.

Because the first tip end 111 and the second tip end 112 of the first tip-end pair 15a1 have been welded to each other, electrical conduction between the fourth tip end 114 and the inner ground electrode 6a via previously joined intervening conductor segments 10 and the welded first tip-end pair 15a1. This creates arc discharge between the welding electrode 2 and the fourth tip end 114 (inner ground electrode 6a) so that an arc current R2a immediately flows between the welding electrode 2 and the inner ground electrode 6a through the fourth tip end 114, the previously joined intervening conductor segments 10, and the welded first tip-end pair 15a1 (see FIG. 5B).

Similarly, the previously welded first tip-end pair 15a1 allows electrical conduction between the third tip end 113 and the inner ground electrode 6a via the previously joined small conductor segment 10b and the welded first tip-end pair 15a1. This creates arc discharge between the welding electrode 2 and the third tip end 113 (inner ground electrode 6a) so that an arc current R2b immediately flows between the welding electrode 2 and the inner ground electrode 6a through the third tip end 113, the small conductor segment 10b, and the welded first tip-end pair 15a1 (see FIG. 5B).

The arc discharge created between the welding electrode 2 and the inner ground electrode 6a through the fourth tip end 114 and between the welding electrode 2 and the inner ground electrode 6a through the third tip end 113 allows a molten area of each of the third and fourth tip ends 113 and 114 to be rapidly increased, making it possible to immediately and stably weld them.

As described above, in the second welding step, the arc current R2a flows between the welding electrode 2 and the inner ground electrode 6a through the fourth tip end 114 independently of the third tip end 113. Similarly, the arc current R2b flows between the welding electrode 2 and the inner ground electrode 6a through the third tip end 113 independently of the fourth tip end 114.

For this reason, even if the gap between the third tip end 113 and the fourth tip end 114 has a certain length, it is possible to rapidly increase a molten area of each of the third and fourth tip ends 113 and 114.

In other words, use of previously joined intervening conductor segments 10 between each of the third and fourth tip ends 113 and 114 and the inner ground electrode 6a as an indirect ground allows the third and fourth tip ends 113 and 114 to be stably welded. Thus, it is possible to elite the necessity of providing any ground electrodes for directly grounding the second tip-end pair 15a2 and the step of pressing one of the third and fourth tip ends 113 and 114 toward the other thereof.

Third Welding Step

Next, welding of the seventh and eighth tip end pairs 117 and 118 of one fourth tip-end pair 15a4 of conductor segments 10a and 10b installed in corresponding slots 22 of the stator core 21 is carried out.

The welding of the seventh and eighth tip end pairs 117 and 118 of one fourth tip-end pair 15a4 aligned with the previously joined first tip-end pair 15a1 can be carried out in the same manner as that of the first and second tip ends 111 and 112 of the first tip-end pair 15a1 described above.

Specifically, an outer ground electrode 6b corresponding to the one fourth tip-end pair 15a4 is selected to be moved by the electrode driver ED toward the eighth tip end 118 under control of the controller 9.

Figure 6A:
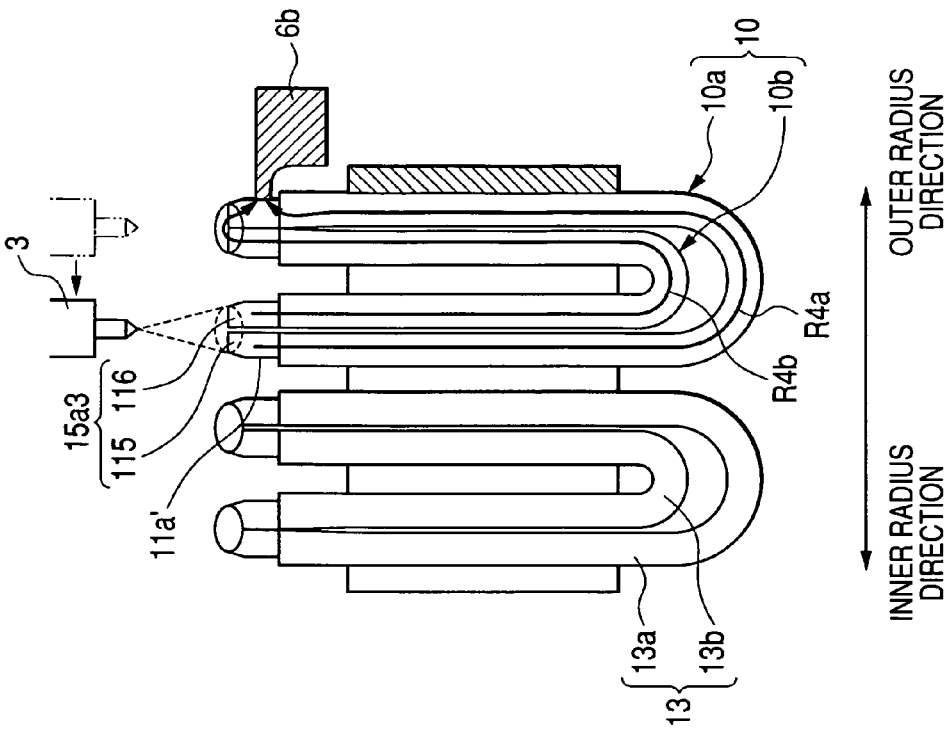
FIG. 6A is a partially enlarged sectional view schematically illustrating how to weld the fourth tip-end pair illustrated in FIG. 4 according to the first embodiment.

When contacting to one side of the eighth tip end 118 of the fourth tip-end pair 15a4, the outer ground electrode 6b is further moved radial inwardly in a direction indicated by an arrow "B" in FIG. 6A. The radial inward movement of the outer ground electrode 6b presses the eighth tip end 118 radial inwardly so that the eighth tip end 118 comes close to the seventh tip end 117 or contacts thereonto.

Next, under control of the controller 9, the robot R moves the welding torch 3 so that the tip end 2a of the welding electrode 2 is located over the fourth tip-end pair 15a4 with a predetermined gap therebetween.

Next, under control of the controller 9, power with adjusted level is supplied from the welding power source 9 to the welding electrode 2. Because the eighth tip end 118 is in contact with the outer ground electrode 6b so that electrical conduction therebetween is established, arch discharge is created between the welding electrode 2 and the eighth tip end 118 (outer ground electrode 6b). This allows an arc current R3a to flow between the welding electrode 2 and the outer ground electrode 6b through the eighth tip end 118.

The created arc discharge between the welding electrode 2 and the eighth tip end 118 allows the eighth tip end 118 to become molten. When the molten area of the eighth tip end 118 is increased, the molten metal is started to be in contact with the seventh tip end 117 so that the seventh tip end 117 is grounded. This allows an arc current R3b to flow between the welding electrode 2 and the outer ground electrode 6b through the eighth and seventh tip ends 118 and 117 to whereby the seventh tip end 117 becomes molten, and thereafter, the molten area of the seventh tip end 117 is increased.

As a result, the molten seventh and eighth tip ends 117 and 118 are welded to each other.

As well as the first welding step, an adequate level of pressing force is applied to the eighth tip end 118 by the movement of the outer ground electrode 6b so that the eighth tip end 118 comes close to or contacts onto the seventh d tip end 117. This allows the gap between the eighth tip end 118 and the seventh tip end 117 to lie within the predetermined limit length set forth above to thereby stably weld the eighth and seventh tip ends 118 and 117 to each other.

Fourth Welding Step

After the third welding step, welding of the fifth and sixth tip end pairs 115 and 116 of one third tip-end pair 15a3 adjacent to the previously joined fourth tip-end pair 15a4 is carried out.

Specifically, after completion of the welding of the fourth tip-end pair 15a4, the outer ground electrode 6b is kept to be in contact with the one side of the eighth tip end 118 of the previously joined fourth tip-end pair 15a4.

Figure 6B:
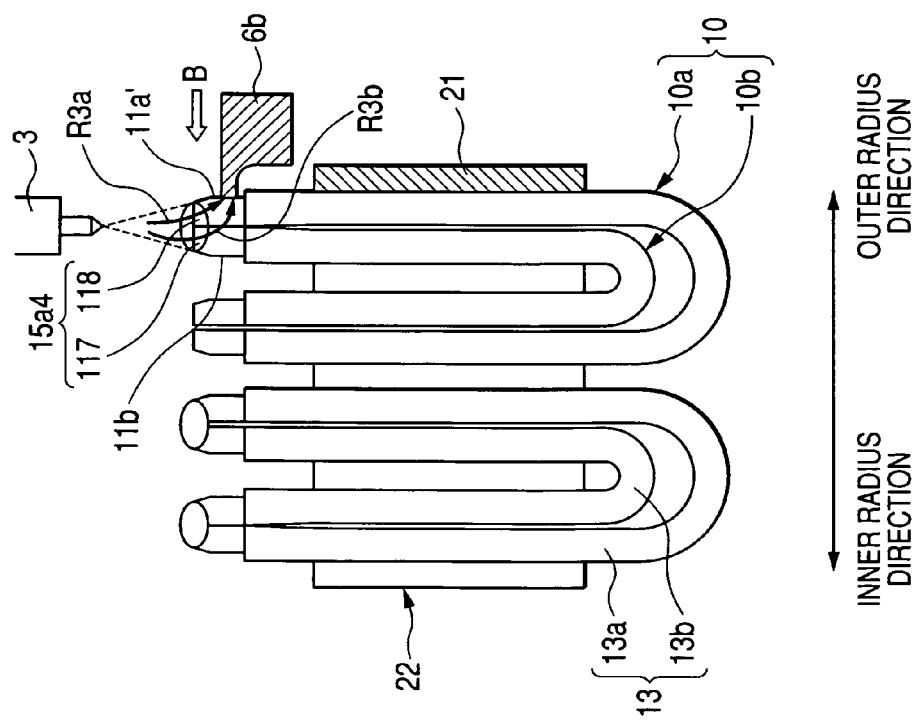
FIG. 6B is a partially enlarged sectional view schematically illustrating how to weld the third tip-end pair illustrated in FIG. 4 according to the first embodiment.

At that time, while the outer ground electrode 6b is kept to be in contact with the one side of the eighth tip end 118 of the previously joined fourth tip-end pair 15a4, the robot R moves the welding torch 3 so that the tip end 2a of the welding electrode 2 is located over the third tip-end pair 15a3 with a predetermined gap therebetween under control of the controller 9 (see FIG. 6B).

Next, under control of the controller 9, power with adjusted level is supplied from the welding power source 9 to the welding electrode 2.

Because the eighth tip end 118 and the seventh tip end 117 of the fourth tip-end pair 15a4 have been welded to each other, electrical conduction between the fit tip end 115 and the outer ground electrode 6b via previously joined intervening conductor segments 10 and the welded fourth tip-end pair 15a4. This creates arc discharge between the welding electrode 2 and the fifth tip end 115 (outer ground electrode 6b) so that an arc current R4a immediately flows between the welding electrode 2 and the outer ground electrode 6b through the fifth tip end 115, the previously joined intervening conductor segments 10, and the welded fourth tip-end pair 15a4 (see FIG. 63).

Similarly, the previously welded fourth tip-end pair 15a4 allows electrical conduction between the sixth tip end 116 and the outer ground electrode 6b via the previously joined interning conductor segment 10b and the welded fourth tip-end pair 15a4. This creates arc discharge between the welding electrode 2 and the third tip end 113 (inner ground electrode 6a) so that an arc current R2b immediately flows between the welding electrode 2 and the inner ground electrode 6a through the third tip end 113, the previously joined intervening conductor segment 10b, and the welded fourth tip-end pair 15a4 (see FIG. 6B).

The arc discharge created between the welding electrode 2 and the outer ground electrode 6b through the fifth tip end 115 and between the welding electrode 2 and the outer ground electrode 6b through the sixth tip end 116 allows a molten area of each of the offhand sixth tip ends 115 and 116 to be rapidly increased, making it possible to immediately and stably weld them.

As described above, in the fourth welding step, the arc current R4a flows between the welding electrode 2 and the outer ground electrode 6b through the fifth tip end 115 independently of the six tip end 116. Similarly, the arc current R4b flows between the welding electrode 2 and the outer ground electrode 6b through the sixth tip end 116 independently of the fifth tip end 115.

For this reason, even if the gap between the fifth tip end 115 and the sixth tip end 116 has a certain length, it is possible to rapidly increase a molten area of each of the fifth and sixth tip ends 115 and 116.

As described above, the conductor-segment joining method according to the first embodiment is configured to sequentially carry out the first and second welding steps using the inner ground electrodes 6a and previously joined intervening conductor segments 10 as an indirect electrode without providing new ground electrodes. This allows the third and fourth tip ends 113 and 114 of the second tip-end pair 15a2 to be stably welded to each other.

Similarly, the conductor-segment joining method according to the first embodiment is configured to sequentially carry out the third and fourth welding steps using the outer ground electrodes 6b and previously joined intervening conductor segments 10 as an indirect electrode without providing new ground electrodes. This allows the fifth and sixth tip ends 115 and 116 of the third tip-end pair 15a3 to be stably welded to each other.

In addition, in the conductor-segment joining method according to the first embodiment, the third and fourth welding steps are substantially identical to the first and second welding steps, respectively. Thus, assuming that the sequential first and second welding steps are collectively referred to as "basic welding step", the conductor-segment joining method can be implemented by simply carrying out the basic welding step at a required number of times.

Note that, in the conductor-segment joining method according to the first embodiment, the first, second, third, and fourth welding steps for respectively joining the radially aligned first, second, fourth, and third tip-end pairs of one of the plurality of sets has been described for the purpose of simplification in description. As illustrated in FIG. 2, the first to fourth welding steps set forth above are therefore actually applied to the stator coil 23 having:

a plurality of sets of the first tip-end pairs; these sets are circumferentially arranged in regular pitches;

a plurality of sets of the second tip-end pairs; these sets are circumferentially arranged in regular pitches;

a plurality of sets of the third tip-end pairs; these sets are circumferentially arranged in regular pitches; and a plurality of sets of the fourth tip-end pairs; these sets are circumferentially arranged in regular pitches.

In this actual application, the conductor-segment joining method according to the first embodiment is configured to:

sequentially carry out the first welding step for the individual first-tip end pairs of each set in a circumferential direction;

sequentially carry out the second welding step for the individual second-tip end pairs of each set in a circumferential direction after all of the first-tip end pairs of the plurality of sets are completely welded;

sequentially carry out the third welding step for the individual fourth-tip end pairs of each set in a circumferential direction after all of the second-tip end pairs of the plurality of sets are completely welded; and sequentially carry out the fourth welding step for the individual third-tip end pairs of each set in a circumferential direction after all of the fourth-tip end pairs of the plurality of sets are completely welded.

This results that all of the first tip-end pairs, second tip-end pairs, third tip-end pairs, and fourth tip-end pairs arranged in a concentric pattern are welded to thereby form the continuous three-phase stator windings 23a (stator coil 23).

These sequential first to fourth welding steps can be carried out by sequentially moving the welding torch 3, rotating the supporting table 5 together with the stator 20, and sequentially moving each of the plurality of inner and outer ground electrodes 6a and 6b under control of the controller 9.

In addition, note that, in the conductor-segment joining method according to the first embodiment, the radially aligned first tip-end pair 15a1, second tip-end pair 15a2, fourth tip-end pair 15a4, and third tip-end pair 15a3 are sequentially welded in this order.

As described above, the conductor-segment joining method according to the first embodiment is configured to weld the intermediate tip-end pairs 15a2 and 15a3 using the inner and outer ground electrodes 6a and 6b and previously joined intervening conductor segments 10 as an indirect electrode.

For this reason, in a modification of the sequential welding order of the conductor-segment jog method according to the first embodiment, the radially aligned first tip-end pair 15a1, fourth tip-end pair 15a4, second tip-end pair 15a2, and third tip-end pair 15a3 can be sequentially welded in this order. In another modification of the sequential welding order of the conductor-segment joining method according to the first embodiment, the radially aligned first tip-end pair 15a1, fourth tip-end pair 15a4, third tip-end pair 15a3, and second tip-end pair 15a2 can be sequentially welded in this order.

In a further modification of the sequential welding order of the conductor-segment joining method according to the first embodiment, the radially aligned fourth tip-end pair 15a4, first tip-end pair 15a1, third tip-end pair 15a3, and second tip-end pair 15a2 can be sequentially welded in this order. In a still further modification of the sequential welding order of the conductor-segment joining method according to the first embodiment, the radially aligned fourth tip-end pair 15a4, first tip-end pair 15a1, second tip-end pair 15a2, and third tip-end pair 15a3 can be sequential welded in this order.

Specifically, the sequential welding order of the conductor-segment joining method according to the first embodiment can be modified as long as each of the intermediate tip-end pairs 15a2 and 15a3 is welded after a corresponding one of the first and fourth tip-end pairs 15a1 and 15a4 has been welded.

A modification of the conductor-segment joining method according to the first embodiment will be described hereinafter.

In the stator coil 23, one tip end 11 and the other tip end 11 of a same conductor segment 10 included in the first group G1 are configured as one first tip-end pair 15a1 and one second tip-end pair 15a2. Similarly, one tip end 11 and the other tip end 11 of a same conductor segment 10 included in the second group G2 are configured as one third tip-end pair 15a3 and one fourth tip-end pair 15a4.

As illustrated in FIGS. 4, 5A, 5B, 6A, and 6B, the stator coil 23 has mainly the configuration.

However, because the stator coil 23 has the neutral point and the leads, part of the stator coil 23 does not have the configuration. For example, in part of the stator coil 23, when one tip end 11w and the other tip end 11w of a same conductor segment 10W serves as a crossover wire connecting between one-phase stator winding and another one-phase stator winding, the one tip end 11w and the other tip end 11w of the same conductor segment 10W are respectively configured as one second tip-end pair 15a2 and one fourth tip-end pair 15a4 (see FIGS. 7A and 7B).

In FIGS. 7A and 7B, the eighth layered straight portions 13a, 13b are summarized to be installed in one slot 22 for the purpose of simplification in illustration.

As illustrated in FIGS. 7A and 7B, eight straight portions 13 are installed in one slot 22 to be radially aligned with each other.

In addition, first to fourth tip-end pairs 15a1 to 15a4 are aligned with each other in a radial direction of the stator core 21.

As described above, the fourth tip end 114 (11w) and the eighth tip end 118 (11w) of the same conductor segment 10W are configured as one second tip-end pair 15a2 and one fourth tip-end pair 15a4 (see FIGS. 7A and 7B).

In the modification, the first tip-end pair 15a1 and the second tip-end pair 15a2 are radially symmetrical to each other in configuration, and the third tip-end pair 15a3 and the fourth tip-end pair 15a4 are radially symmetrical to each other in configuration. For this reason, as well as the first embodiment, execution of the basic welding step (the pair of first and second welding steps) at a required number of times allows each of the first to fourth tip-end pairs 15a1 to 15a4 to be stably welded.

Next, the first and second welding steps (basic welding step) of the conductor-segment joining method according to the modification of the first embodiment will be specifically described hereinafter with reference to FIGS. 7A and 7B.

First Welding Step

The stator 20 is mounted at its stator core 21 in the support 5b mounted on the mount surface 5a of the table 5 such that the plurality of sets of the first to eighth tip ends 111 to 118 is in upward direction with respect to the mount surface 5a thereof preparatory to the conductor-segment joining method.

When the first and second tip end pairs 111 and 112 of one first tip-end pair 15a1 of conductor segments 10a and 10b installed in corresponding slots 22 of the stator core 21 is welded to each other, an inner ground electrode 6a corresponding to the one first tip-end pair 15a1 is selected to be moved by the electrode driver ED toward the first tip end 111 under control of the controller 9.

Similarly, an outer ground electrode 6b corresponding to one fourth tip-end pair 15a4 radially aligned with the selected one first tip-end pair 15a1 is selected to be moved by the electrode driver ED toward the eighth tip end 118 under control of the controller 9.

When contacting to one side of the first tip end 111 of the first tip-end pair 15a1, the inner ground electrode 6a is further moved radial outwardly in a direction indicated by an arrow "A" in FIG. 7A. The radial outward movement of the inner ground electrode 6a presses the first tip end 111 radial outwardly so that the first tip end 111 comes close to the second tip end 112 or contacts thereonto.

Similarly, when contacting to one side of the eighth tip end 118 of the fourth tip-end pair 15a4, the outer ground electrode 6b is further moved radial inward in a direction indicated by an arrow "B" in FIG. 7A. The radial inward movement of the outer ground electrode 6b presses the eighth tip end 118 radial inwardly so that the eighth tip end 118 comes close to the seventh tip end 117 or contacts thereonto.

Next, under control of the controller 9, the robot R moves the welding torch 3 so that the tip end 2a of the welding electrode 2 is located over the first tip-end pair 15a1 with a predetermined gap therebetween.

Next, under control of the controller 9, power with adjusted level is supplied from the welding power source 9 to the welding electrode 2. Because the first tip end 111 is in contact with the inner ground electrode 6a so that electrical conduction therebetween is established, arch discharge is created between the welding electrode 2 and the first tip end 111 (inner ground electrode 6a). This allows an arc current R5a to flow between the welding electrode 2 and the inner ground electrode 6a through the first tip end 111.

The created arc discharge between the welding electrode 2 and the first tip end 111 allows the first tip end 111 to become molten. When the molten area of the first tip end 111 is increased, the molten metal is started to be in contact with the second tip end 112 so that the second tip end 112 is grounded. This allows an arc current R5b to flow between the welding electrode 2 and the inner ground electrode 6a through the first and second tip ends 111 and 112 to whereby the second tip end 112 becomes molten, and thereafter, the molten area of the second tip end 112 is increased.

As a result, the molten first and second tip ends 111 and 112 are welded to each other.

Specifically, in the modification, the first welding step substantially identical to that according to the first embodiment is carried out.

Second Welding Step

After the first welding step, welding of the third and fourth tip end pairs 113 and 114 of one second tip-end pair 15a2 adjacent to the previously joined first tip-end pair 15a1 is carried out.

Specifically, after completion of the welding of the first tip-end pair 15a1, the inner ground electrode 6a is kept to be in contact with the one side of the first tip end 111 of the previously joined first tip-end pair 15a1.

At that time, while the inner ground electrode 6a is kept to be in contact with the one side of the first tip end 111 of the previously joined first tip-end pair 15a1, the robot R moves the welding torch 3 so that the tip end 2a of the welding electrode 2 is located over the second tip-end pair 15a2 with a predetermined gap therebetween under control of the controller 9 (see FIG. 7B).

Next, under control of the controller 9, power with adjusted level is supplied from the welding power source 9 to the welding electrode 2.

As set forth above, the previously welded first tip-end pair 15a1 allows electrical conduction between the third tip end 113 and the inner ground electrode 6a via the previously joined small conductor segment 10b and the welded first tip-end pair 15a1. This creates arc discharge between the welding electrode 2 and the third tip end 113 (inner ground electrode 6a) so that an arc current R6a immediately flows between the welding electrode 2 and the inner ground electrode 6a through the third tip end 113, the corresponding small conductor, segment 10b, and the welded first tip-end pair 15a1 (see FIG. 7B).

In addition, the eighth tip end 118 of the fourth tip-end pair 15a4 and the four tip end 114 of the second tip-end pair 15a2 allow electrical conduction therebetween via an intervening conductor segment 10, and the outer ground electrode 6b is in contact with the eighth tip end 118.

This creates arc discharge between the welding electrode 2 and the fourth tip end 114 (outer ground electrode 6b) so that an arc current R6b immediately flows between the welding electrode 2 and the outer ground electrode 6b trough the fourth tip end 114, the intervening conductor segment 10W, and the fourth tip-end pair 15a4 (see FIG. 7B).

The arc discharge created between the welding electrode 2 and the inner ground electrode 6a through the third tip end 113 and between the welding electrode 2 and the outer ground electrode 6b through the fourth tip end 114 allows a molten area of each of the third and fourth tip ends 113 and 114 to be rapidly increased, making it possible to immediately and stably weld them.

As described above, in the second welding step, the arc current R6a flows between the welding electrode 2 and the inner ground electrode 6a through the third tip end 113 independently of the fourth tip end 114. Similarly, the arc current R1b flows between the welding electrode 2 and the outer ground electrode 6b through the fourth tip end 114 independently of the third tip end 113.

For this reason, even if the gap between the third tip end 113 and the fourth tip end 114 has a certain length, it is possible to rapidly increase a molten area of each of the third and fourth tip ends 113 and 114.

Thus, it is possible to eliminate the necessity of providing any ground electrodes for directly grounding the second tip-end pair 15a2 and the step of pressing one of the third and fourth tip ends 113 and 114 toward the other thereof.

As described above, the conductor-segment joining method according to each of the first embodiment and its modification is configured to weld the intermediate tip-end pairs 15a2 and 15a3 using the inner and outer ground electrodes 6a and 6b and previously joined intervening conductor segments 10 as an indirect electrode without requiring any ground electrodes for directly grounding the second and third tip-end pairs 15a2 and 15a3.

It is possible to therefore easily and rapidly join each of the first to fourth tip-end pairs 15a1 to 15a4 without increasing the number of welding processes.

In the first embodiment and its modification, an adequate level of pressing force is applied to the tip end 11 of an innermost or outermost conductor segment 10 by the movement of the corresponding ground electrode member 6. This allows the tip end of the innermost or outermost conductor segment to come close to or contact onto the tip end 11' of another conductor segment 10' adjacent to the innermost or outermost conductor segment 10. The gap between the tip end 11 of the innermost or outermost conductor segment 10 and the tip end 11' of another conductor segment 10' can be therefore reduced.

This causes an arc current to easily and immediately flow between the welding electrode 2 and the ground electrode member 6 through the tip ends 10 and 10', malting it possible to stably and rapidly weld the tip end 11 of the innermost or outermost conductor segment 10 and the tip end 11' of another conductor segment 10'.

In the first embodiment and its modification, an arc current flows between the welding electrode 2 and the ground electrode member 6 through one tip end 11 of one intermediate tip-end pair independently of the other tip end 11' thereof via the previously joined innermost or outermost tip-end pair 15a1 or 15a4. Similarly, an arc current flows between the welding electrode 2 and the inner ground electrode member 6 through the other tip end 11' of the one intermediate tip-end pair independently of the one tip end 11 thereof.

For this reason, even if the gap between the one and the other tip ends 11 and 11' has a certain length, it is possible to rapidly increase a molten area of each of the one and the other tip ends 11 and 11'.

In other words, use of previously joined intervening conductor segments 10 between each of the one and the other tip ends 11 and 11' and the ground electrode member 6 as an indirect ground allows the one and the other tip ends 11 and 11' to be stably welded. Thus, it is possible to eliminate the necessity of providing any ground electrodes for directly grounding the pair of one and the other tip ends 11 and 11' and the step of pressing one of the tip ends 11 and 11' toward the other thereof. This can more simplify the manufacturing processes of the stator coil 23 while keeping low the manufacturing cost.

The conductor-segment joining method according to the first embodiment and its modification is configured to cause relative movement of the welding torch 3 and a plurality of sets of radially-aligned tip-end pairs arranged in a concentric pattern in the torch working space. This can carry out sequential welding for each of the tip-end pairs with high accuracy, thus rapidly and stably welding each of the tip-end pairs. This makes it possible to increase the time required to completely join each of the tip-end pairs so as to form the stator coil 23 (the continuous three-phase stator windings).

Second Embodiment

The second embodiment of the present invention will be described hereinafter with reference to FIG. 8. Like parts between the first and second embodiments, to which like reference characters are assigned, are omitted or simplified in description.

In the first embodiment, the conductor-segment joining method is applied to the stator coil 23 having the eight-layer and four-row configuration as illustrated in FIGS. 2 and 4.

Figure 8:
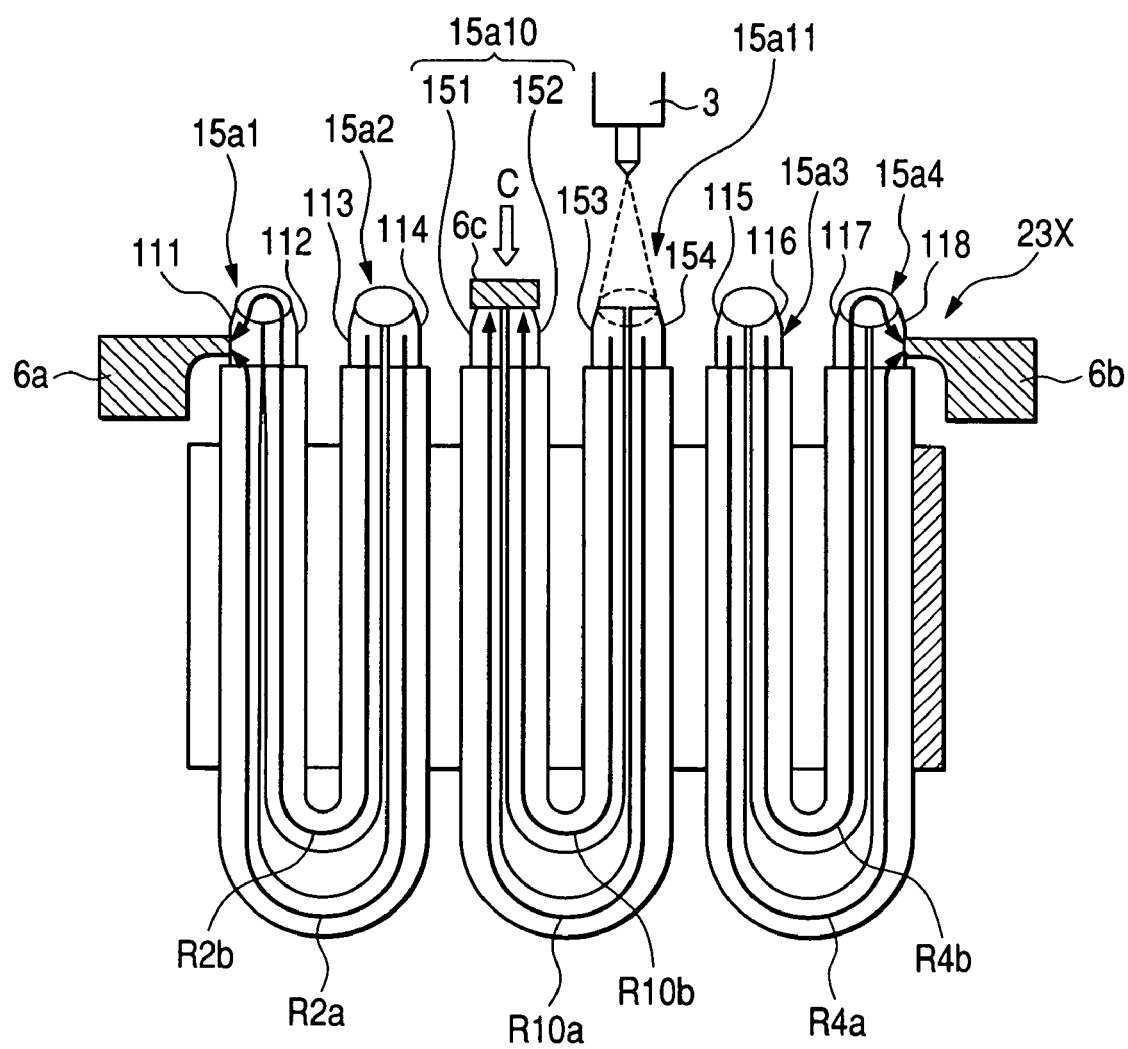
FIG. 8 is a partially enlarged sectional view schematically illustrating how to weld first and second intermediate tip-end pairs according to a second embodiment of the present invention.
Figure 9:
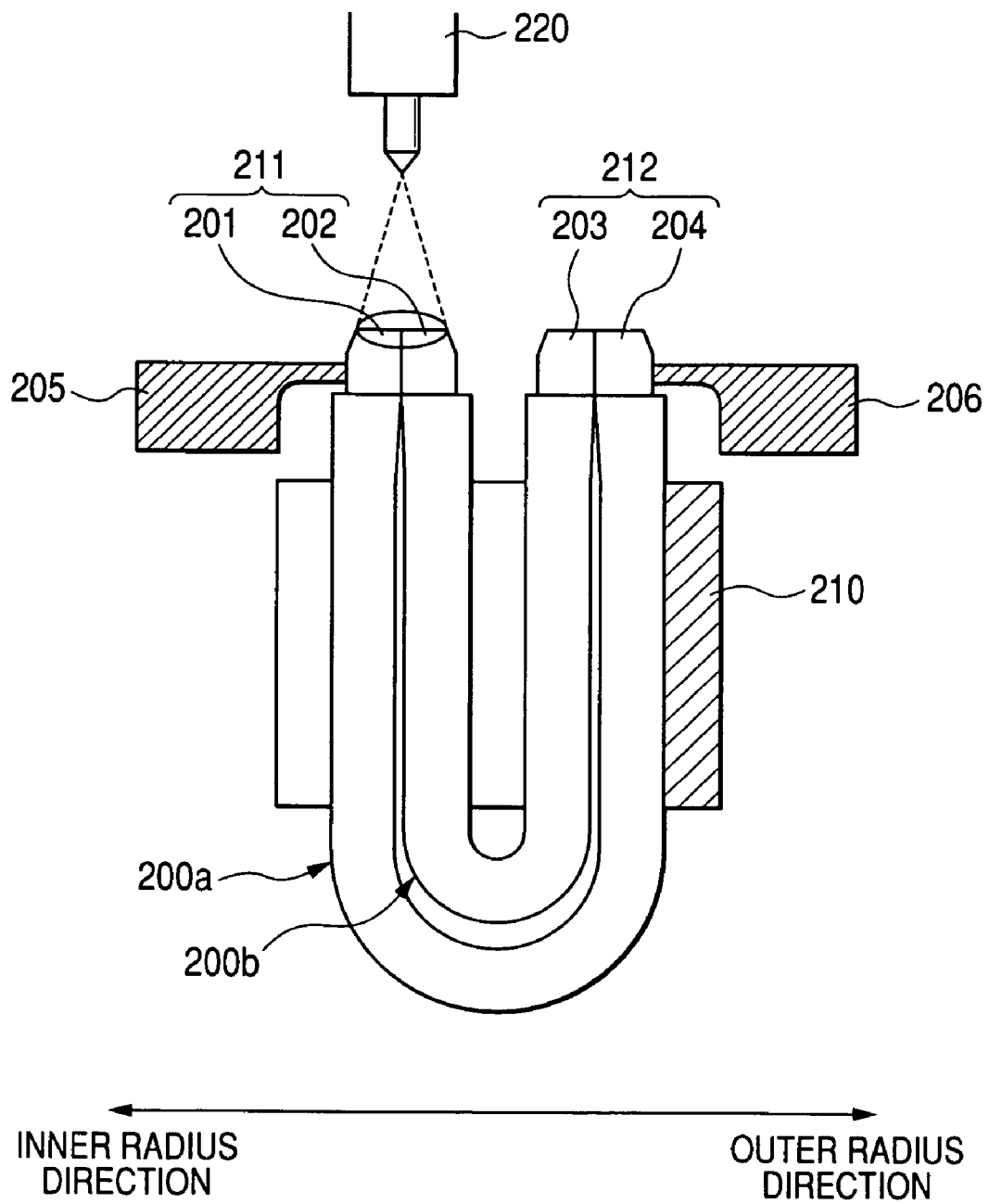
FIG. 9 is a partially enlarged sectional view schematically illustrating a conventional method of welding a pair of large and small conductor segments.

In contrast, a conductor-segment joining method according to the second embodiment is applied to a stator coil 23X having a twelfth-layer and six-row configuration illustrated in FIG. 8.

As illustrated in FIG. 8, a first intermediate tip-end pair 15a10 composed of ninth tip end 151 and tenth tip end 152 and a second intermediate tip-end pair 15a11 composed of eleventh tip end 153 and twelfth tip end 154 are located between the second tip-end pair 15a2 and the third tip-end pair 15a3.

In the configuration of the stator core 23X, the conductor-segment joining method according to the first embodiment can weld the second tip-end pair 15a2 with the use of the first tip-end pair 15a1 as an indirect ground electrode, and similarly, weld the third tip-end pair 15a3 with the use of the fourth tip-end pair 15a4 as an indirect ground electrode.

In the configuration of the stator core 23X, however, the conductor-segment joining method according to the first embodiment cannot weld the first intermediate tip-end pair 15a10 and the second intermediate tip-end pair 15a11 because each of the first and fourth previously joined tip-end pairs 15a1 and 15a4 cannot be used as an indirect ground electrode.

Thus, in the second embodiment, the ground electrode members 6 further consists of a plurality of intermediate ground electrodes 6c located over the circumferentially arranged first and second intermediate tip-end pairs 15a10 and 15a11 with regular intervals corresponding to the pole pitches of the rotor. Each of the plurality of intermediate ground electrodes 6c has a substantially annular cylindrical shape as a whole.

Specifically, when the ninth and tenth tip ends 151 and 152 of one first intermediate tip-end pair 15a10 of conductor segments 10a and 10b installed in corresponding slots 22 of the stator core 21 is welded to each other, an intermediate ground electrode 6c corresponding to the one first intermediate tip-end pair 15a10 is selected to be moved by the electrode driver ED toward the ninth and tenth tip ends 151 and 152 under control of the controller 9.

When contacting to the ninth and tenth tip ends 151 and 152 of the first intermediate tip-end pair 15a10, the intermediate ground electrode 6c is further moved axial downwardly in a direction indicated by an arrow "C" in FIG. 8. The axial downward movement of the intermediate ground electrode 6c presses the ninth and tenth tip ends 151 and 152 axial downwardly.

Next under control of the controller 9, the robot R moves the welding torch 3 so that the tip end 2a of the welding electrode 2 is located over the second intermediate tip-end pair 15a11 with a predetermined gap therebetween.

Next, under control of the controller 9, power with adjusted level is supplied from the welding power source 9 to the welding electrode 2. Because the ninth and tenth tip ends 151 and 152 are in contact with the intermediate ground electrode 6c so that electrical conduction therebetween is established, arch discharge is created between the welding electrode 2 and each of the eleventh and twelfth tip ends 153 and 154 (intermediate ground electrode 6c). This allows an arc current R10a to flow between the welding electrode 2 and the intermediate ground electrode 6c through the twelfth tip end 154 and an arc current R10b to flow between the welding electrode 2 and the intermediate ground electrode 6c through the eleventh tip end 153.

The created arc discharge between the welding electrode 2 and each of the eleventh and twelfth tip ends 153 and 154 allows each of the eleventh and twelfth tip ends 153 and 154 to become molten. When the molten area of each of the eleventh and twelfth tip ends 153 and 154 is increased, the molten eleventh and twelfth tip ends 153 and 154 are welded to each other.

Thereafter, welding of the ninth and tenth tip ends 151 and 152 of the second intermediate tip-end pair 15a2 with which the intermediate ground electrode 6c is in contact is carried out.

Specifically, the intermediate ground electrode 6c is moved by the electrode driver ED toward the previously joined eleventh and twelfth tip ends 153 and 154 under control of the controller 9. This allows the intermediate ground electrode 6c to be in contact with the previously joined eleventh and twelfth tip ends 153 and 154 of the second intermediate tip-end pair 15a11.

Next, under control of the controller 9, the robot R moves the welding torch 3 so that the tip end 2a of the welding electrode 2 is located over the first intermediate tip-end pair 15a10 with a predetermined gap therebetween.

Next, under control of the controller 9, power with adjusted level is supplied from the welding power source 9 to the welding electrode 2. Because the eleventh and twelfth tip ends 153 and 154 are pressed to be in contact with the intermediate ground electrode 6c so that electrical conduction therebetween is established, arch discharge is created between the welding electrode 2 and each of the ninth and tenth tip ends 151 and 152 (intermediate ground electrode 6c). This allows a first arc current, whose direction is opposite to that of the arc cent R10a, to flow between the welding electrode 2 and the intermediate ground electrode 6c through the ninth tip end 151 and a second arc current, whose direction is opposite to that of the arc current R10b, to flow between the welding electrode 2 and the intermediate ground electrode 6c through the tenth tip end 152.

The created arc discharge between the welding electrode 2 and each of the ninth and tenth welding tip ends 151 and 152 allows each of the ninth and tenth tip ends 151 and 152 to become molten. When the molten area of each of the ninth and tenth tip ends 151 and 152 is increased, the molten ninth and tenth tip ends 151 and 152 are welded to each other.

At that time, if there are not-yet-joined intermediate tip-end pairs, the welding processes using the intermediate ground electrodes 6c can be repeated until all of the not-yet-joined intermediate tip-end pairs are completely welded.

Accordingly, in the second embodiment, even if a stator coil having a many-layer and many-row configuration greater than the stator coil 23 having an eighth-layer and four-row configuration according to the first embodiment, it is possible to:

move an intermediate ground electrode 6c contact with one tip ends of at least one intermediate tip-end pair between the second and third tip-end pair 15a2 and 15a3;

move the welding torch 3 so that the tip end 2a of the welding electrode 2 is located over the other tip ends of the at least one intermediate tip-end pair; and supply an arc current through the welding electrode 2 and the intermediate ground electrode 6c so as to cause an arc current to immediately flow through the other tip ends of the at least one intermediate tip-end pair to the intermediate ground electrode 6c, thus rapidly and stably welding the other tip ends of the at least one intermediate tip-end pair.

In the first embodiment and its modifications, while the power is supplied from the welding power source 9 to the welding electrode 2, the conductor-segment joining method is configured to:

sequentially move the welding torch 3 over the circumferentially arranged first-tip end pairs individually to weld them;

sequentially move the welding electrode 2 over the circumferentially arranged first-tip end pairs individually to weld them;

sequentially move the welding electrode 2 over the circumferentially arranged second-tip end pairs individually to weld them;

sequentially move the welding electrode 2 over the circumferentially arranged third-tip end pairs individually to weld them; and sequentially move the welding electrode 2 over the circumferentially arranged fourth-tip end pairs individually to weld them.

The present invention is however not limited to the structure.

Specifically, every time the welding electrode 2 is moved to be located over each of the first to fourth tip end pairs, the welding power source 4 can be controlled by the controller 9 to supply power to a corresponding one of the first to fourth tip end pairs. Every time the welding electrode 2 is moved from each of the first to fourth tip end pairs, the welding power source 4 is controlled by the controller 9 to stop the power supply to a corresponding one of the first to fourth tip end pairs.

In each of the first and second embodiments, as an example of various joining machines, the TIG welding system 1 is used, but another joining system, such as $CO_2$ welding system or MIG welding system can be used in place of the TIG welding system 1.

In each of the first and second embodiments, as an example of various joining machines, the TIG welding system 1 for generating an arc current is used, but another joining system with the use of energization of each of the tip-end pairs to be joined, such as a laser welding system for generating a laser beam, can be used.

While them has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A method of joining a plurality of conductor segments each inserted in at least one of a plurality of slots formed in a stator core, each of the plurality of conductor segments having an end projecting from a corresponding at least one of the plurality of slots, the method comprising the steps of:

(a) arranging the ends of the plurality of conductor segments such that a plurality of pairs of the ends of the plurality of conductor segments are formed, the plurality of pairs of the ends of the plurality of conductor segments including first paired ends and second paired ends, at least one of first paired conductor segments corresponding to the first paired ends included in the plurality of conductor segments and at least one of second paired conductor segments corresponding to the second paired ends included in the plurality of conductor segments being electrically conducted to each other;

(b) preparing a first electrode;

(c) preparing a second electrode;

(d) moving the first electrode so as to be in contact with at least part of the first paired ends of the first paired conductor segments;

(e) moving the second electrode so as to be opposite to the first paired ends of the first paired conductor segments;

(f) establishing electric conduction between the first electrode and the second electrode via the first paired ends of the first paired conductor segments so as to weld the first paired ends of the first paired conductor segments based on the electrical conduction therebetween;

(g) moving the second electrode so as to be opposite to the second paired ends of the second paired conductor segments while the first electrode is kept in contact with the at least part of the first paired ends of the first paired conductor segments; and (h) establishing electric conduction between the first electrode and the second electrode via the welded first paired ends of the first paired conductor segments and the second paired ends of the second paired conductor segments so as to weld the second paired ends of the second paired conductor segments based on the electrical conduction therebetween, wherein a plurality of first sets of the first paired ends of the first paired conductor segments are aligned in a circumferential direction of the stator core with first pitches, a plurality of second sets of the second paired ends of the second paired conductor segments are aligned in a circumferential direction of the stator core with second pitches so as to be arranged radial outwardly from the plurality of first sets, a plurality of third sets of the second paired ends of the second paired conductor segments are aligned in a circumferential direction of the stator core with third pitches so as to be arranged radial outwardly from the plurality of second sets, a plurality of fourth sets of the first paired ends of the first paired conductor segments are aligned in a circumferential direction of the stator core with fourth pitches so as to be arranged radial outwardly from the plurality of third sets, the (d), (e), and (f) steps are carried out for each of the plurality of first sets of the first paired ends of the first paired conductor segments so that each of the plurality of first sets of the first paired ends of the first paired conductor segments is welded, the (g) and (h) steps are carried out for each of the plurality of second sets of the second paired ends of the first paired conductor segments so that each of the plurality of second sets of the second paired ends of the second paired conductor segments is welded after completion of the (d), (e), and (f) steps for each of the plurality of first sets, the (d), (e), and (f) steps are carried out for each of the plurality of fourth sets of the first paired ends of the first paired conductor segments so that each of the plurality of fourth sets of the first paired ends of the first paired conductor segments is welded, and the (g) and (h) steps are carried out for each of the plurality of third sets of the second paired ends of the second paired conductor segments so that each of the plurality of third sets of the second paired ends of the second paired conductor segments is welded after completion of the (d), (e), and (f) steps for each of the plurality of fourth sets.

2. The method according to claim 1, wherein the welding of each of the plurality of first sets of the first paired ends of the first paired conductor segments, the welding of each of the plurality of second sets of the second paired ends of the second paired conductor segments, the welding of each of the plurality of fourth sets of the first paired ends of the first paired conductor segments, and the welding of each of the plurality of third sets of the second paired ends of the second paired conductor segments form at least one continuous stator winding to be installed in stator core.

3. The method according to claim 1, wherein one of: at least one of the first paired conductor segments of the plurality of first sets, and at least one of the second paired conductor segments of the plurality of second sets serves as a crossover conductor segment connected to one of: at least one of the first paired conductor segments of the plurality of fourth sets, and at least one of the second paired conductor segments of the plurality of third sets.

4. The method according to claim 1, wherein the plurality of first sets of the first paired ends of the first paired conductor segments, the plurality of second sets of the second paired conductor segments, the plurality of third sets of the second paired ends of the second paired conductor segments, and the plurality of fourth sets of the first paired ends of the first paired conductor segments are radially aligned with each other, and the first, second, third, and fourth pitches are set to be equal to each other.

5. The method according to claim 4, wherein the (d), (e), (f), (g), and (h) steps are sequentially carried out for each of the plurality of first sets of the first paired ends of the first paired conductor segments, each of the plurality of second sets of the second paired ends of the second paired conductor segments, each of the plurality of fourth sets of the first paired ends of the first paired conductor segments, and each of the plurality of third sets of the second paired ends of the second paired conductor segments by circumferentially and radially moving the second electrode while the second electrode is being energized.

6. The method according to claim 1, wherein the (d) step is configured to:

move the first electrode toward the first paired ends of the first paired conductor segments;

contact the first electrode with one of the first paired ends of the first paired conductor segments such that the one of the first paired ends is arranged between the first electrode and the other of the first paired ends; and move the first electrode toward a center axis of the stator core to press the one of the first paired ends toward the other thereof.

7. The method according to claim 1, wherein the plurality of pairs of the ends of the plurality of conductor segments include third paired ends, at least one of third paired conductor segments corresponding to the third paired ends included in the plurality of conductor segments, and a plurality of fifth sets of the third paired conductor segments are aligned in a circumferential direction of the stator core with fifth pitches so as to be arranged between the plurality of second sets of the second paired conductor segments and the plurality of third sets of the second paired conductor segments, further comprising:

(i) preparing a third electrode;

(j) moving the third electrode so as to be in contact with at least part of the third paired ends of the third paired conductor segments;

(k) moving the second electrode so as to be opposite to the third paired ends of the third paired conductor segments; and (l) establishing electric conduction between the third electrode and the second electrode via the third paired ends of the third paired conductor segments so as to weld the third paired ends of the third paired conductor segments based on the electrical conduction therebetween.

8. The method according to claim 1, wherein the (d), (e), and (f) steps are sequentially carried out for each of the plurality of first sets of the first paired ends of the first paired conductor segments by circumferentially moving the second electrode relative to each of the plurality of first sets of the first paired ends of the first paired conductor segments while the second electrode is being energized.

9. A method of joining a plurality of conductor segments each inserted in at least one of a plurality of slots formed in a stator core, each of the plurality of conductor segments having an end projecting from a corresponding at least one of the plurality of slots, the method comprising the steps of:

(a) arranging the ends of the plurality of conductor segments such that a plurality of pairs of the ends of the plurality of conductor segments are formed, the plurality of pairs of the ends of the plurality of conductor segments including first paired ends and second paired ends, at least one of first paired conductor segments corresponding to the first paired ends included in the plurality of conductor segments and at least one of second paired conductor segments corresponding to the second paired ends included in the plurality of conductor segments being electrically conducted to each other;

(b) preparing a first electrode;

(c) preparing a second electrode;

(d) moving the first electrode so as to be in contact with at least part of the first paired ends of the first paired conductor segments;

(e) moving the second electrode so as to be opposite to the first paired ends of the first paired conductor segments;

(f) establishing electric conduction between the first electrode and the second electrode via the first paired ends of the first paired conductor segments so as to weld the first paired ends of the first paired conductor segments based on the electrical conduction therebetween;

(g) moving the second electrode so as to be opposite to the second paired ends of the second paired conductor segments while the first electrode is kept in contact with the at least part of the first paired ends of the first paired conductor segments; and (h) establishing electric conduction between the first electrode and the second electrode via the welded first paired ends of the first paired conductor segments and the second paired ends of the second paired conductor segments so as to weld the second paired ends of the second paired conductor segments based on the electrical conduction therebetween, wherein the first electrode is a negative electrode and the second electrode is a positive electrode, the (f) step is configured to establish electric conduction between the negative electrode and the positive electrode via the first paired ends of the first paired conductor segments to generate arc discharge therebetween so as to weld the first paired ends of the first paired conductor segments based on the generated arc discharge, and the (h) step is configured to establish electric conduction between the negative electrode and the positive electrode via the welded first paired ends of the first paired conductor segments and the second paired ends of the second paired conductor segments to generate arc discharge therebetween so as to weld the second paired ends of the second paired conductor segments based on the generated arc discharge.

\* \* \* \* \*